US 7,761,601 B2

(12) United States Patent
Falkenburg et al.

(10) Patent No.: US 7,761,601 B2
(45) Date of Patent: Jul. 20, 2010

(54) STRATEGIES FOR TRANSFORMING MARKUP CONTENT TO CODE-BEARING CONTENT FOR CONSUMPTION BY A RECEIVING DEVICE

(75) Inventors: Steven J. Falkenburg, Los Altos, CA (US); Ada Y. Chan, Sunnyvale, CA (US); Bradley R. Pettit, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1128 days.

(21) Appl. No.: 11/097,814

(22) Filed: Apr. 1, 2005

(65) Prior Publication Data

US 2006/0224690 A1  Oct. 5, 2006

(51) Int. Cl.
G06F 15/16 (2006.01)
G06F 17/00 (2006.01)
G06F 9/45 (2006.01)

(52) U.S. Cl. .................. 709/246; 715/234; 715/238; 717/146

(58) Field of Classification Search .......... 715/234, 715/238; 709/246; 717/146
See application file for complete search history.

(56) References Cited

U.S. PATENT DOCUMENTS

| | | | |
|---|---|---|---|
| 5,987,256 A * | 11/1999 | Wu et al. | 717/146 |
| 6,262,729 B1 | 7/2001 | Marcos et al. | |
| 6,286,043 B1 | 9/2001 | Cuomo et al. | |
| 6,411,950 B1 * | 6/2002 | Moricz et al. | 707/3 |
| 6,601,108 B1 * | 7/2003 | Marmor | 709/246 |
| 6,704,024 B2 * | 3/2004 | Robotham et al. | 345/581 |
| 6,725,424 B1 * | 4/2004 | Schwerdtfeger et al. | 715/239 |
| 7,047,318 B1 | 5/2006 | Svedloff | |
| 7,174,506 B1 | 2/2007 | Dunsmoir et al. | |
| 7,640,494 B1 * | 12/2009 | Chen et al. | 715/234 |
| 7,664,813 B2 * | 2/2010 | Pettit et al. | 709/203 |
| 2003/0055816 A1 * | 3/2003 | Paine et al. | 707/3 |
| 2003/0106022 A1 | 6/2003 | Goodacre et al. | |
| 2003/0140118 A1 | 7/2003 | Alexander Lloyd et al. | |
| 2004/0025190 A1 * | 2/2004 | McCalla et al. | 725/133 |
| 2004/0187079 A1 | 9/2004 | Yamada et al. | |

(Continued)

OTHER PUBLICATIONS

Bos et al., Cascading Style Sheets Level 2 Specification, May 12, 1998, World Wide Web Consortium, pp. 1-2, 62-64, 200.*

(Continued)

Primary Examiner—Nathan Flynn
Assistant Examiner—James E Conaway
(74) Attorney, Agent, or Firm—Lee & Hayes, PLLC

(57) ABSTRACT

Proxy functionality is described for receiving a request for markup content from a receiving device, retrieving the markup content, converting the markup content to code-bearing content, and transferring the code-bearing content to the receiving device. The receiving device can then consume the code-bearing content without the use of conventional browser functionality. The proxy functionality can convert the markup content to code-bearing content by identifying a set of features that captures the characteristics of the markup language content, and then translating those features into to the code-bearing content (in association with identified data resources). The converting can also include identifying features that are contingent on focusable elements (e.g., links) having focus (or not having focus), and formulating this dependency in conditional statements within the code-bearing content. Finally, the markup content can also include code content embedded therein or referenced therein.

15 Claims, 14 Drawing Sheets

U.S. PATENT DOCUMENTS

2008/0016464 A1    1/2008    Gao et al.

OTHER PUBLICATIONS

McLain, Jay, Did You Know Pocket IE on Windows Mobile 2003 Supports CSS?, Aug. 12, 2004, http://blogs.msdn.com/windowsmobile/articles/213771.aspx.*

Wikipedia, Internet Explorer Mobile, Jul. 22, 2008, http://en.wikipedia.org/wiki/Internet_Explorer_Mobile.*

Microsoft homepage HTML source code, Mar. 14, 2005, http://www.microsoft.com.*

Mozilla, nsCSSStyleSheet.cpp, Feb. 27, 2005, ftp://ftp.mozilla.org/pub/firefox/releases/1.0.1/.*

Mozilla, nsEventStateManager.cpp, Feb. 27, 2005, ftp://ftp.mozilla.org/pub/firefox/releases/1.0.1/.*

Andersson et al., Scalable Vector Graphics (SVG) 1.1 Specification, World Wide Web Consortium, Jan. 14, 2003.*

Nottingham, Caching Tutorial for Web Authors and Webmasters, Jun. 19, 2000.*

Baron, Mozilla's Layout Engine, Dec. 14, 2006.*

Ciancarini et al., An extensible rendering engine for XML and HTML, Aug. 3, 1999.*

Baron, Style System Tech Talk, Jun. 24, 2002.*

O'Callahan, Well, I'm Back: Frame Display Lists, Nov. 4, 2005.*

MSN TV 2 homepage, provided by MSN TV of Mountain View, CA, available at <<http:vvww.webtv.com/pc/>>, accessed on Nov. 8, 2005, 1 page.

Pocket PC homepage, provided by Microsoft Corporation of Redmond, WA, available at <<http://www.microsoft.com/windowsmobile/pocketpc/ppc/default.mspx>>, accessed on Nov. 8, 2005, 2 pages.

* cited by examiner

STRATEGIES FOR TRANSFORMING MARKUP CONTENT TO CODE-BEARING CONTENT FOR CONSUMPTION BY A RECEIVING DEVICE

TECHNICAL FIELD

This subject matter relates to strategies for processing markup content for receipt and consumption by a receiving device.

BACKGROUND

According to conventional strategies, a client device can access web-related content ("consumable content") using a browser. That is, the browser forwards a request over a network, prompting the network to identify the location of a source of the requested content. The source then transfers the requested content to the client device. The received content is typically expressed in a markup language format, such as the Hypertext Markup Language (HTML) format, the Dynamic HTML (DHTML) format, and so forth. By way of overview, using a tag-based hierarchical structure, HTML markup identifies components in the consumable content and identifies the manner in which the browser should present these components. Dynamic HTML supplements HTML by including information that also governs the behavior of the consumable content (such as by specifying the behavior of a web page when a user focuses on a link within the web page). Conventionally, the browser renders the received content using a suite of integrated technologies, such as Cascading Style Sheets (CSS) functionality, Document Object Model (DOM) functionality, scripting functionality, and so forth.

FIG. 1 shows a system 100 that represents the above-described traditional solution. In this system 100, a client device 102 transmits a request for consumable content (such as a web page) into a network 104 (such as the Internet). The network 104 resolves the location of the consumable content, which, in this case, corresponds to markup content source 106. In response to the request, the markup content source 106 forwards markup content 108 to the client device 102 via the network 104. The client device 102 includes browser 110 for processing the received markup content 108. The browser 110 can include a CSS engine, a scripting engine, a layout engine, and so forth. Using these tools, the browser 110 converts the markup content 108 into consumable content 112, and presents this consumable content 112 on an output device 114 (such as a computer display device). The presented content can include conventional elements, such as text, images, links, and so forth.

The above solution works well for most client devices, such as personal computers, which receive markup content via the Internet. However, this solution does not provide an optimal solution for all types of client devices. For instance, smaller client devices may have reduced resources, such as reduced memory and/or processor-related resources. Exemplary such "resource-constrained" devices include set-top boxes, personal digital assistants (PDAs), mobile telephones, various kinds of wearable computing devices (e.g., smart watches), and so forth. It may be difficult or impossible to duplicate the full suite of browser tools used in a desktop environment in these types of devices due to memory limitations, processor limitations, and/or any other limitations.

Nevertheless, the above-described approach of forwarding markup code to the client device has become entrenched in the industry. Thus, known attempts to address the above-identified problem do not fundamentally alter this content-delivery paradigm. For example, one proposal is to simplify the markup content before it is forwarded to resource-constrained client devices. One means of accomplishing this simplification is to specify the content in a more restrictive language, such as XHTML (which comprises a more restricted representation of the HTML language using XML). This potentially allows the client device to employ a browser that is correspondingly less complex and which consumes fewer resources compared to its desktop counterpart. But the fact remains that the client device is still wedded to the traditional browser paradigm; namely, a simplified browser is still a browser consuming markup language content (potentially using a scripting engine), and this functionality, albeit simplified, is still resource-intensive.

Another proposal is to enhance the resources of the smaller client devices in a brute force manner, that is, by adding more memory or more powerful processors in these devices. But this strategy is disadvantageous because it may negatively affect the cost (and hence marketability) of these devices. Further, in many cases, a device provider may have invested considerable sums of money to deploy a large number of client devices to the public, and it is not economically feasible to change the hardware of these devices in a substantive manner. This constraint, for example, often applies to providers of set-top boxes.

For at least the above-identified reasons, there is an exemplary need for more satisfactory strategies for providing consumable content to client devices, especially, but not limited to, resource-constrained client devices.

SUMMARY

According to one exemplary implementation, a method is described for providing consumable content to a receiving device. The method comprises: (a) receiving a request for document content (e.g., markup content) associated with the consumable content; (b) loading the requested document content from a source of the document content; (c) identifying at least one feature of the document content, to thereby form an identified feature set; (d) forming code that can be executed by the receiving device to provide the identified feature set, to thereby provide code-bearing content; and (e) forwarding the code-bearing content to the receiving device in response to the request.

Additional exemplary implementations are described in the following.

Figure 1:
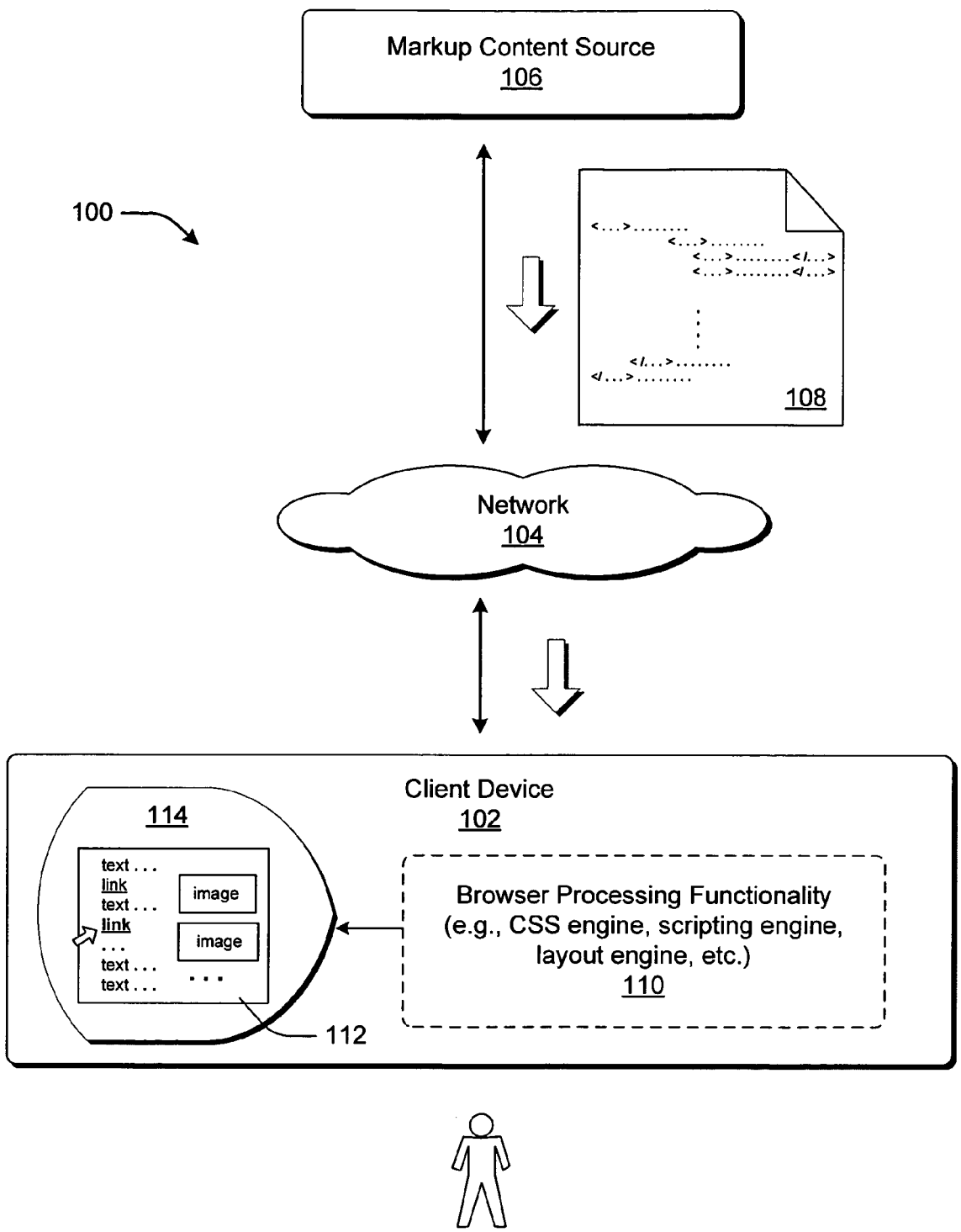
FIG. 1 shows a conventional strategy for providing markup content to a receiving device.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth a unique strategy for delivering consumable content to a receiving device (e.g., a client device). The strategy uses proxy functionality to receive a user's request for markup content, retrieve and load the markup content, and transform the markup content into code-bearing content. More specifically, the code-bearing content includes executable code in conjunction with data resources (such as image resources, font resources, link resources, and so forth). The executable code expresses drawing operations defined by the markup content, but without the use of markup content itself.

The strategy then forwards the code-bearing content to the receiving device. The receiving device can consume the consumable content based on the code-bearing content. Importantly, the receiving device can consume the code-bearing content without the use of conventional browser functionality (such as a CSS engine, scripting engine, and so forth), because, in essence, the proxy functionality has already converted the markup content to executable code. Thus, the use of this strategy is optimally suited for use by resource-constrained receiving devices that may not have enough memory or processing resources to implement a conventional browser.

According to another feature, the strategy forms the code-bearing content by identifying a complete set of features expressed by the markup content. To provide the complete set, the strategy first determines a base set of features in the consumable content that appear in the consumable content when no focusable element has received focus. (A "focusable element" can refer to a link that the user can focus on within a displayed web page by interacting with it.) Second, the strategy can determine how the features of the consumable content change when different focusable elements in the consumable content receive focus. This can be determined by methodically investigating the behavior of the consumable content when each focusable element contained therein receives focus. This operation forms an on-focus feature set. The strategy then determines differences between the base set of features and the on-focus set of features to produce difference information. The strategy uses this difference information to update the base set of features to yield the complete set of features. When it comes time to form code that expresses the features in the complete set, the strategy expresses focus-dependent features using conditional code instructions (e.g., branching-type instructions).

According to another exemplary feature, the strategy can leverage the use of the proxy functionality to add code within the markup content itself. In one case, the markup content can include the code in inline fashion. Or the markup content can include a reference to the code. This aspect of the strategy is advantageous, as it provides a convenient means for injecting code resources within the consumable content without requiring the receiving device to deploy a scripting engine.

According to another exemplary feature, the strategy can generate code-bearing content that is tailored to respective feature sets of different resource-constrained receiving devices. In contrast, prior approaches required that each different type of resource-constrained device implement a potentially different type of complex browser (for processing markup content and script, etc.). The present strategy moves the locus of this complexity to the proxy functionality, making the functionality used by the receiving device potentially less complex and less resource-intensive, as well as potentially less device-dependent.

Additional features and attendant benefits of the strategy will be set forth in this description.

At the outset, it should be noted that the following discussion is framed in the context of certain exemplary concrete environments to facilitate discussion, but the principles described here are not limited to these environments. For example, one example described herein sets forth the use of the strategy in a system in which the receiving device is a set-top box. But the strategy can be used by any receiving device, including wearable computers (watches), mobile phones, personal digital assistants (PDAs), and so forth. Further, one example described herein sets forth the use of the strategy in a system in which the receiving device is resource-constrained. But the strategy can also be gainfully employed by a receiving device that has enough resources to implement a traditional browser, such as a personal computer. Further, one example described herein sets forth the use of the strategy within the context of certain programming frameworks, such as Microsoft Corporation's .NET Framework (produced by Microsoft Corporation of Redmond, Wash.), or derivatives thereof. However, the strategy described herein also finds use in other virtual machine programming frameworks (such as the Java framework provided by Sun Microsystems, Inc. of Santa Clara, Calif.), or in a framework that does not rely on a virtual machine paradigm. Thus, occasional reference to Microsoft-centric .NET features (such as "managed code," "assembly," and so forth) should be construed as pertaining only to exemplary implementations.

As to terminology, the term "markup content" refers to content that is expressed in any markup language, including, but not limited to, HTML, DHTML, SVG, and SMIL, etc. Markup content expresses consumable content in a descriptive manner, rather than in a programmatic manner. The strategy can also be applied to documents that have other characteristic formats besides markup formats, such as the PDF format. In this case, the proxy functionality can transform this characteristic format into drawing commands that can be assembled into code-bearing content for execution on the receiving device.

The term "consumable content" refers to content that can be presented to a consumer in some format. According to one implementation, the consumable content pertains to displayable user interface (UI) content. But the consumable content can also be presented in some other way, such as via an audio output mechanism, a tactile output mechanism, and so forth (or some combination thereof).

The term "code-bearing content" refers to content that includes, as at least one component thereof, executable code. As used herein, "code" refers to instructions that can be executed by a processing device to provide the consumable content, as opposed to descriptive content which merely describes the consumable content.

This disclosure includes the following sections. Section A describes the structural aspects of the above-described strategy. Second B describes the procedural aspects of the above-described strategy. Section C describes a search-related application of the strategy.

A. Exemplary Structural Aspects of the Strategy

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code (and/or declarative-type instructions) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. System Overview

Figure 2:
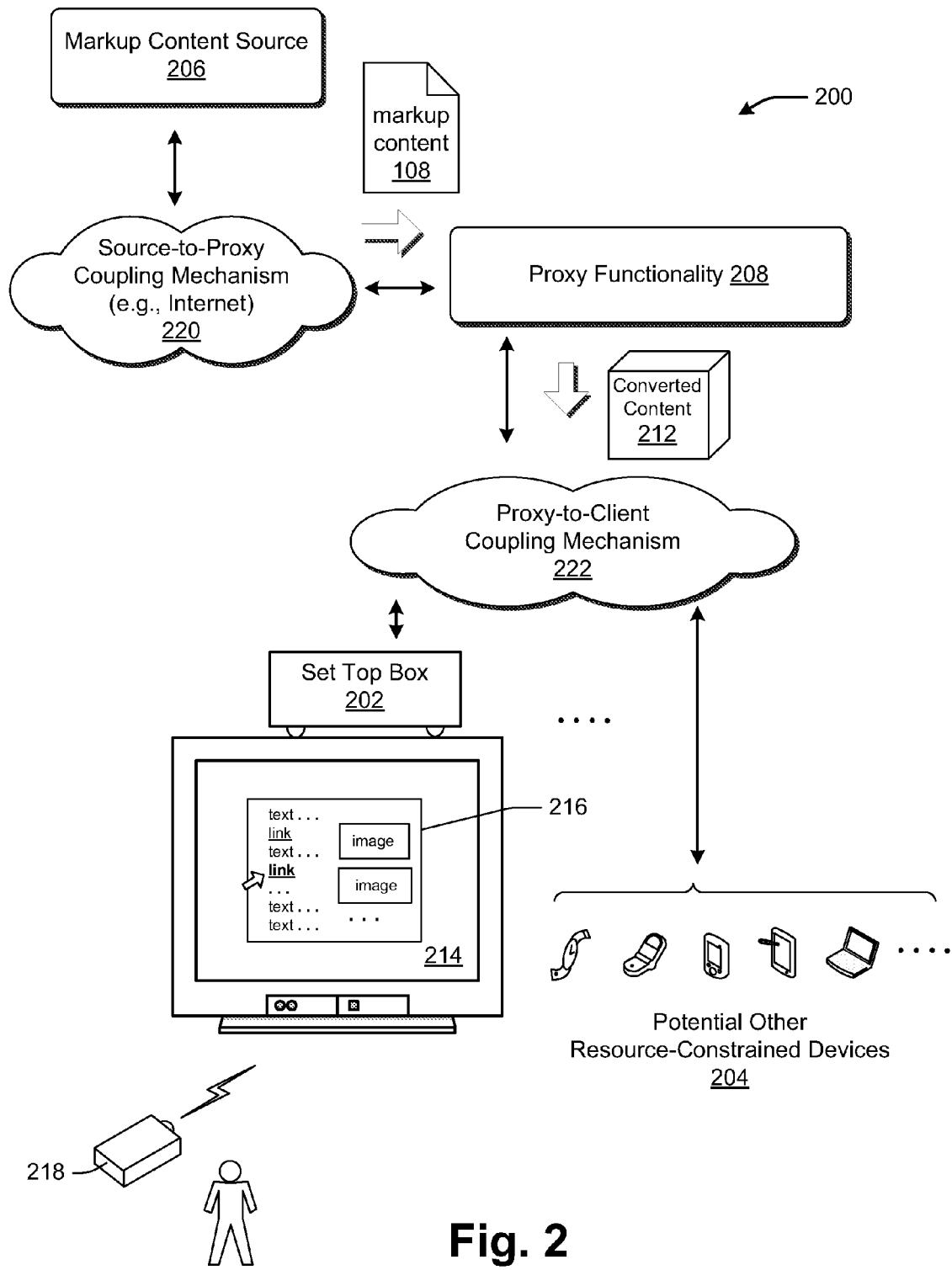
FIG. 2 shows a system for processing markup content for receipt by a receiving device according to the principles of the present invention.

To begin with, FIG. 2 shows an overview of a system 200 in which the improved strategy summarized above can be deployed. The system 200 includes a plurality of resource-constrained devices (202, 204) for receiving consumable content from a source 206 via proxy functionality 208. Each of the aspects of this system 200 will be set forth below. In the following, the set-top box 202 will serve as a representative of a broad class of possible receiving (202, 204), including wearable computers, mobile phones, Personal Digital Assistants (PDAs), tablet-type devices, and so forth.

The proxy functionality 208 comprises a service that: (a) receives requests for consumable content by the receiving device 202; (b) accesses and loads markup content 108 corresponding to the consumable content from a markup content source 206; (c) transforms the markup content 108 into converted content 212 which expresses the markup content, in part, with executable code; and (d) transfers the converted content 212 to the receiving device 202 for execution by the receiving device 202. Later figures describe the operation of the proxy functionality 208 in greater detail.

Upon receipt, the receiving device 202 can employ client-side content processing functionality (not shown in FIG. 2) to execute the converted content 212. Because the converted content 212 has, in effect, already been transformed to code and associated data resources by the proxy functionality 208, the receiving device 202 can present the consumable content without the use of conventional browser functionality. Namely, the receiving device 202 can dispense with the use of CSS, scripting, and layout engines, and so forth. (In connection therewith, the label "proxy" assigned to the proxy functionality 208 derives from the fact that the proxy functionality 218 is serving as a proxy for the browser functionality traditional implemented at the client.) Later figures describe the operation of the client-side processing functionality in greater detail.

The client-side processing functionality can output the processed consumable content to an output device 214 as a user interface presentation 216. The user interface presentation 216 can include conventional features of web-based consumable content, such as image content, text content, focusable links, form controls such as text input fields, check-boxes, radio buttons, and so forth. The user may interact with the user interface presentation 216 using any input device. In the particular case of a set-top box environment, the user can use remote control device 218 to interact with the user interface presentation 214. If the user applies focus to one of the focusable elements in the user interface presentation 214, then the client-side processing functionality can change the behavior of the user interface presentation 214. For instance, the client-side processing functionality can alter the appearance of the user interface presentation 214 in a programmatic manner determined by the received code-bearing content, as opposed to executing a script in the conventional manner. If the user activates a link which requires accessing another web page, then the client-side processing functionality sends another request to the proxy functionality 208, resulting in the repetition of the above-described process with respect to subsequently retrieved markup language content 108.

The proxy functionality 208 can access markup content 108 from the markup content source 206 via a source-to-proxy coupling mechanism 220. The proxy functionality 208 can interact with the receiving device 202 via a proxy-to-client coupling mechanism 222. In one case, these two coupling mechanisms (220, 222) can represent separate coupling mechanisms; in another case, these two coupling mechanisms (220, 222) can represent the same coupling mechanisms (or can at least share resources). Any of the coupling mechanisms (220, 222) can represent any kind of digital network (or combination of networks), such as a wide area network (e.g., the Internet), an intranet, and so forth. The coupling mechanisms (220, 222) can rely on any variety of wired and/or wireless links, and any combination of communication technologies (such as various name servers, gateways, Digital Subscriber Line (DSL) infrastructure, and so forth.

To name one specific scenario, the system 200 can implement the source-to-proxy coupling mechanism 220 via a wide area network (WAN), such as the Internet. The system 200 can also implement the proxy-to-client coupling mechanism 222 as the same WAN. Alternatively, or in addition, the system 200 can implement the proxy-to-client coupling mechanism 222 using special gateway functionality. Alternatively, or in addition, the system 200 can implement the proxy-to-client coupling mechanism 222 using DSL functionality, and so forth. The reader will appreciate that there are many more such coupling strategies that can be used; different technical and business considerations will play a role in determining which solution is best for a particular deployment environment.

In one exemplary implementation, the receiving device 202 can be loosely considered as connected to the proxy functionality 208 in the sense that it can request and receive replies from the proxy functionality 208. However, the receiving device 202 and the proxy functionality 208 need not establish a dedicated connection that remains continuously intact throughout an entire communication session; rather, the receiving device 202 can couple to the proxy functionality 208 for the purpose of making requests, but otherwise remains unconnected to the proxy functionality 208 (even when processing requests associated with a user's interaction with a single user interface page). This connection strategy is distinct from technology such as Remote Desktop Protocol (RDP) for various reasons; for example, RDP technology establishes a continuous connection between a server computer and a client computer.

As a final note with respect to FIG. 2, this figure shows the proxy functionality 208 as being provided at a remote location with respect to the receiving device 202. However, in another case, the proxy functionality 208 can be located at the same location as the receiving device 202. For instance, the proxy functionality 208 could potentially be implemented as a module that locally couples to the receiving device 202 and transforms the markup content 108 into the converted content 212 for dissemination to the receiving device 108. For example, consider the scenario where the proxy functionality 208 represents a computer that runs within a local workplace, processing web-related requests from employees in the workplace (who might, for example, operate small hand-held or wearable computer devices). Or consider the scenario where the proxy functionality 208 represents an optional card or other module that actually plugs into the receiving device 202 to provide the functions described above. Still other permutations of the functionality shown in FIG. 2 are possible.

Figure 3:
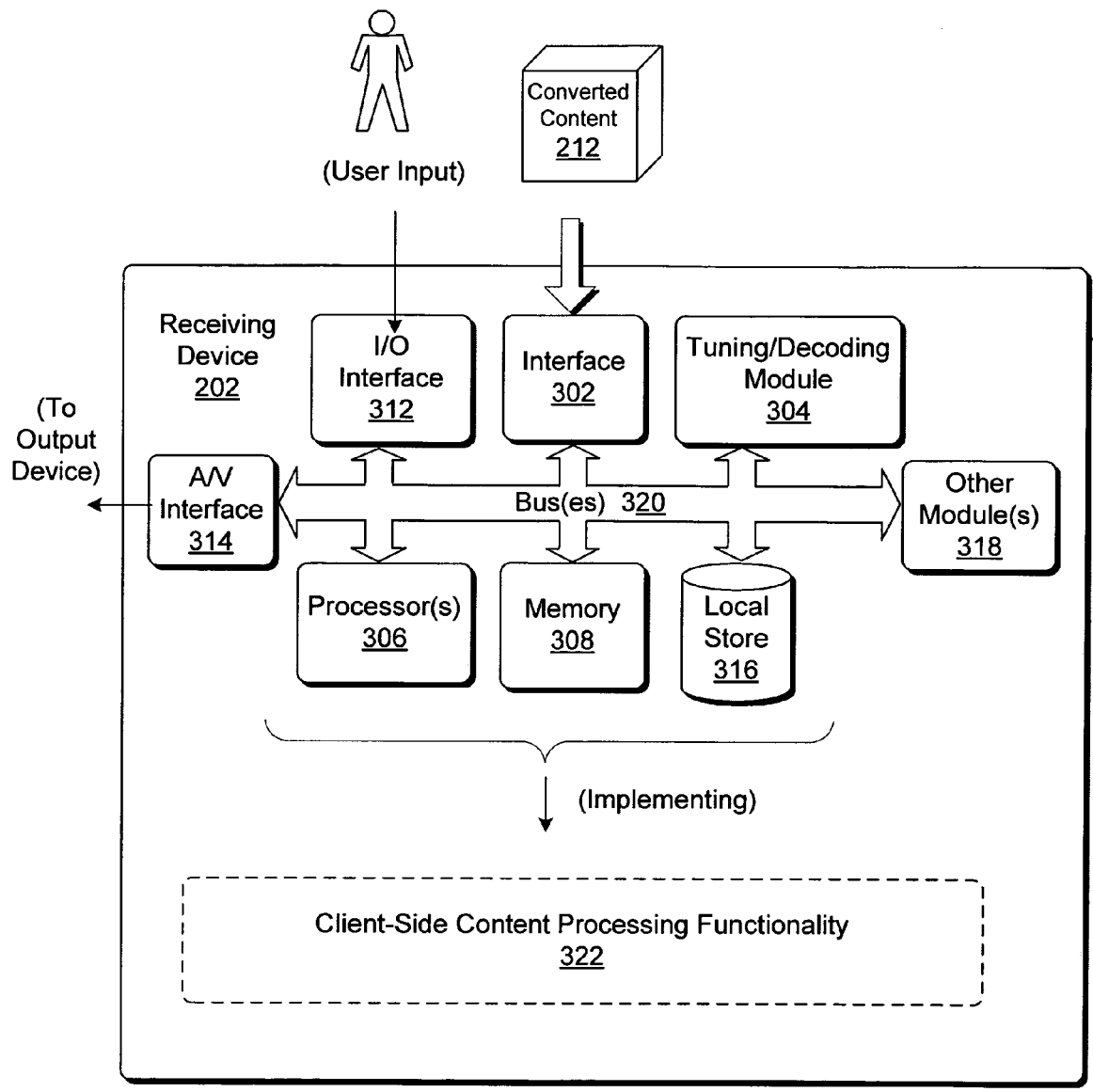
FIG. 3 shows an exemplary receiving device for use in the system of FIG. 2.

FIG. 3 shows the composition of the exemplary receiving device 202, which, in this case, corresponds to a set-top box. A set-top box receives media information (e.g., television programs, VOD movies, etc.) in addition the converted content 212. In one case, the provider of the media information can administer the proxy functionality 208. In another case, two different entities can provide these two respective services.

To begin with, the receiving device 202 can include an interface module 302. The interface module 302 can represent any functionality for receiving media information (and the converted content 212) from any source using any coupling mechanism. For example, the interface module 302 can include a DSL modem, a cable modem, a broadband modem, a wireless network interface, an Ethernet NIC, or other kind of network interface equipment.

The receiving device 202 can also include a tuner/decoder module 304 for performing any kind of initial processing on the received media information, such as decoding the media information, potentially decompressing the media information, and so forth. In the case of broadcast services, the tuning/decoding module 304 can select one or more channels of media information via any kind of tuning mechanism (such as by tuning to a prescribed physical frequency that provides a desired channel, and so forth). In the case of network delivery of media information, the tuning/decoding mechanism can rely on virtual tuning mechanisms to receive a channel (e.g., by "tuning" to a prescribed unicast or multicast source of media information).

The receiving device 202 can include other hardware, such as one or more processors 306 for executing instructions that implement the functionality of the receiving device 202. The receiving device 202 can also include memory 308 (such as RAM memory, flash memory, etc.). A portion of the memory 308 may comprise a FIFO-type buffer (not shown) for storing media information prior to the information being decoded. The receiving device 202 can also include an I/O interface 312 for interacting with the user via one or more input devices (e.g., the remote controller 218, and so forth). The receiving device 202 can also include an A/V interface module 214 for providing media information in an appropriate format to the output device 214 (or other output device). The receiving device 202 can also include an optional local store 318 for storing any kind of data and/or program information.

The receiving device 202 can also include various other modules 318, not specifically enumerated in the figure. For instance, the receiving device 202 can include a graphics compositor (not shown) for combining a video component of the media information from the tuning/decoding module 304 with graphics information. The graphics information may comprise various user interface presentations which are overlaid on the video content.

Finally, the receiving device 202 can include one or more buses 320 for coupling the above-identified components together.

The receiving device 202 can use the above-described hardware to provide client-side content processing functionality 322. For example, machine-readable instructions stored in the memory 308 can be used to implement the client-side processing functionality 322 when executed by the processor 306. The purpose of the client-side processing functionality 322 is to process the converted content 212 (in the manner described more fully below in the context of FIG. 5), to present consumable content for output to the output device 214.

A.2. The Proxy Functionality

Figure 4:
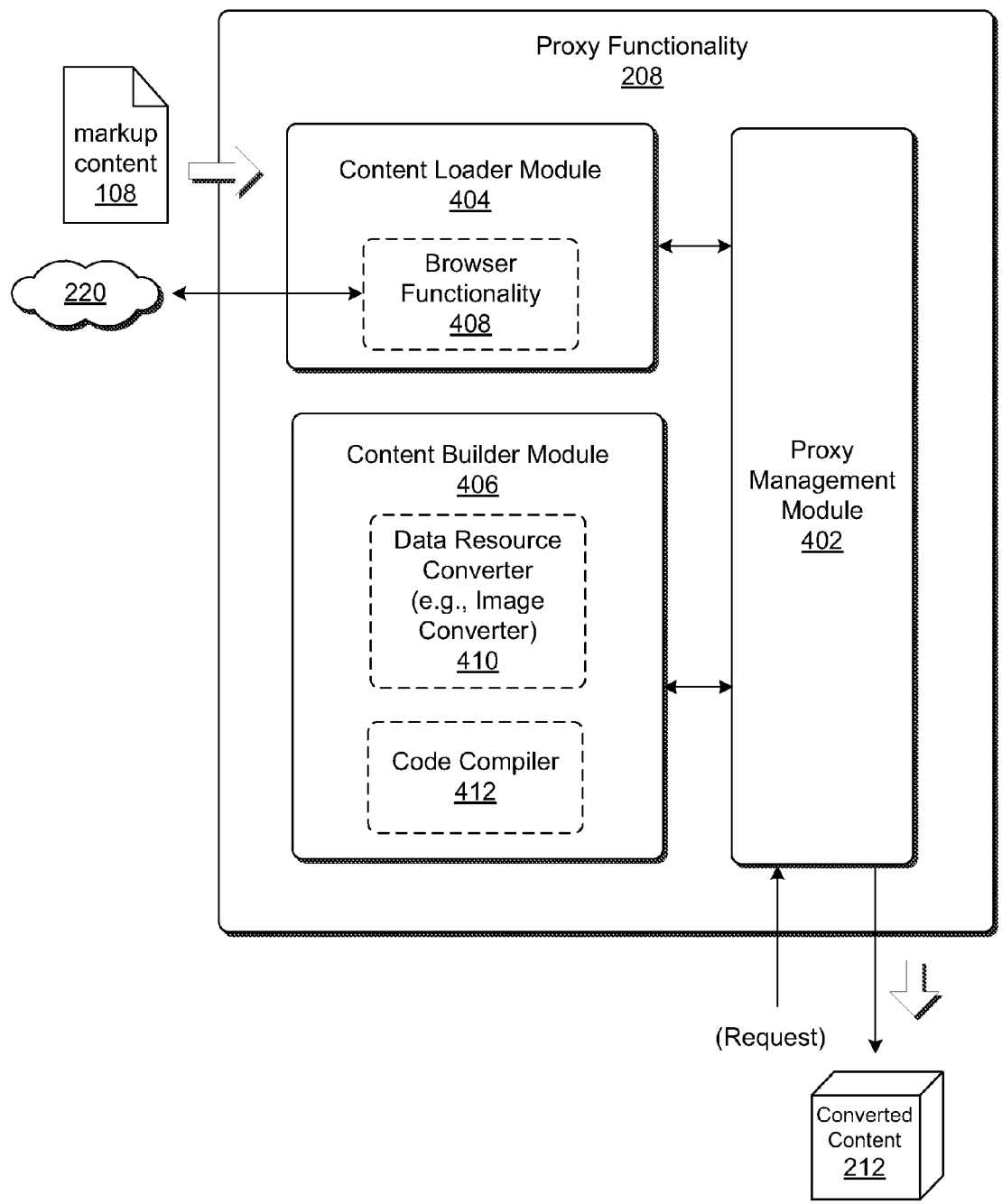
FIG. 4 shows exemplary proxy functionality for use in the system of FIG. 2.

FIG. 4 is a more detailed exemplary depiction of the proxy functionality 208 introduced in FIG. 1. The exemplary components of the proxy functionality 208 include a proxy management module 402, a content loader module 404, and a content builder module 406. These components are intended to generally represent functions performed by the proxy functionality 208, as implemented in software, hardware, or a combination of software and hardware. The allocation of functions to these specific-named components is merely exemplary.

To begin with, the proxy management module 402 generally serves the role of coordinating the operation of the proxy functionality 208. For example, the proxy management module 402 can receive a request from the receiving device 202 for consumable content. This request can be formulated as an HTTP request. In one case, the HTTP request can include routing information which identifies the proxy functionality 208 as the intermediary recipient. In another case, the system 200 can redirect the user's request to the proxy functionality 208 even though the request may not expressly identify the proxy functionality 208. As another function, the proxy management module 402 also coordinates the transfer of the converted content 212 to the receiving device 202. The proxy management module 202 can format the converted content 212 into any required package format, and can send the package to the receiving device in any way (e.g., as a stream of digital information). Finally, the proxy management module 402 coordinates the operation of the content loader module 404 and the content builder module 406.

The content loader module 404 also performs multiple tasks. According to one task, the content loader module 404 receives a request to retrieve markup content 108 from the proxy management module 402. In response, the content loader module 404 forms an instance of browser functionality 408, and then uses this browser functionality 408 to retrieve and load the markup content 108 via the source-to-proxy coupling mechanism 220. In performing this task, the browser functionality 408 serves as a proxy for the browser functionality that is traditionally deployed at the client.

The content loader module 404 can also identify the features in the loaded markup content 108. More specially, assume that the markup content 108 refers to a web page. This web page may have text content, image content, form-related content, focusable element content (e.g., link-related content), and so forth. The content loader module 404 takes inventory of these different features. It can do this in various ways. According to one exemplary implementation, a two pass approach is used. In this first pass, the content loader module 404 uses DOM-related functionality to enumerate all of the elements identified in the markup content 108 by effectively "walking" a hierarchical tree defined by the markup content 108. (That is, different tags in the markup content identify different elements, and the elements can be hierarchically nested within the markup content 108 to form a "tree.") The details extracted in the first pass can include characteristics such as (but not limited to): font family, size, color, on-screen position, bounding box information, URL information, link navigation data, form submit data, and so forth. In performing the first pass, the content loader module 404 strips the features that have been identified from the consumable content. In the second pass, the content loader module 404 "prints" the remaining consumable content to a graphics metafile, excluding, content that may have already been captured in the first pass (such as text information).

The extracted features can be represented in various ways. In one technique, the proxy functionality 208 represents the features as drawing operations. These drawing operations comprise instructions to draw corresponding features.

Enumeration of the features of the consumable content forms a base feature set. This base feature set corresponds to a list of features contained in the consumable content when no focusable element within the consumable content has received focus. The term "focusable element" refers to any item in the consumable content that permits the user to interact with it. For example, a feature, such as a link, is said to receive initial focus when the user targets this element by "moving" to it, e.g., by simply advancing to it using an input mechanism. This element is specifically said to have "active" focus when the user subsequently invokes this element, such as by pressing an "enter" or "OK" key when focus remains on the element. In the following discussion, the term "focus" will generally refer to a state invoked when the user either simply advances to a focusable element or when the user also activates the element or when the user takes any other action with respect to the focusable element to cause it to enter the prescribed state.

A web page produced using DHTML markup can include focusable elements that, when selected, change the presentation behavior of the web page. For instance, when the user clicks on a particular link in the web page, the web page may exhibit some predefined behavior, such as by changing the display appearance of the web page (such as by presenting new textual or image information, or possibly by presenting motion video or animation). Alternatively, or in addition, when the user clicks on a particular link, the web page may remove one or more previously displayed features from the web page.

This description sets forth several examples in which the focusable elements comprise links. However, as noted above, the term "focusable element" has broad connotation, referring to any element having a state that can be changed in any manner through the user's interaction with it. Additional types of focusable elements can comprise check-boxes and radio buttons, a scrolling element, and so forth.

In any event, as explained, the base set of features corresponds to the features of the consumable content that appear when none of the focusable elements receive focus. However, in order to duplicate the richness of DHTML behavior in code, the proxy functionality 208 needs to also account for the features that appear (or disappear) when the user places focus on the focusable elements. To this end, the content loader module 404 also enumerates the behavior of the consumable content when the focusable elements receive focus.

To achieve this result, the content loader module 404 can successively apply focus to each focusable element. That is, for each focusable element, the content loader module 404 can identify the features that appear in the consumable content when that focusable element receives focus. This process is repeated for each focusable element. The end-result is the compilation of an on-focus set of features, which represents the aggregation of the features identified through the successive investigation of individual focusable states. Then, the content loader 404 determines how the on-focus set of features differs from the base set of features. The content loader module 404 compiles difference information that reflects these differences, and then adds this difference information to the base set of features to provide a complete (or final) list of non-redundant features associated with the consumable content. The complete set of features accounts for the entire behavior of the consumable content. In one case, the difference information may indicate that certain features appear when certain focusable elements receive focus. In another case, the difference information may reveal that certain features disappear when certain focusable elements receive focus.

Having compiled the complete set of non-redundant features associated with the consumable content, the proxy management module 402 instructs the content builder module 406 to create the converted content 212. The converted content 212 expressed all of the features in the final set of features in a ready-to-execute code form. To do this, the content builder module 406 converts the features in the final set of features into executable code, in conjunction with data resources that can be referenced by the executable code. For example, the executable code content can be expressed in any program language, including, but not limited to, the C# language. (The C# language utilizes the resources of a common language runtime platform provided by .NET, but other implementations need not leverage virtual machine platforms.) The data resources can comprise various images resources, font resources, link resources, and so forth, which are used in the consumable content. The executable code and/or data resources may also identify navigation information, which identifies the navigation behavior of the consumable content when the user enters navigation instructions (e.g., by pressing up/down and left/right navigation keys on the remote controller 218).

More specifically, to build the executable code component of the code-bearing content 212, the content builder module 406 translates the features identified by the content loader module 404 into drawing instructions that are executed by a drawing method. Some of the features in the final set of features are non-contingent, meaning that their behavior does not depend on the focusable state of any focusable element; other features are contingent, meaning that their behavior is dependent on focusable state. The content builder module 406 can express non-contingent features as non-contingent drawing instructions. The content builder module 406 can express contingent features as contingent drawing instructions, which can be formulated as if-type branching instructions. After piecing together source code that has the desired instructions, the content builder module 406 compiles this source code into an executed module (e.g., as an executable assembly in the .NET Framework).

To achieve the above results, the content builder module 406 can include a resource converter 412. The resource converter can be used to convert data resources (e.g., images, etc.) from an original form to whatever format is required by the receiving device 202. For example, this converter 410 can convert MPEG still background information into a desired format for presentation by the receiving device 202 (in conjunction with the execution of the code).

The content builder module 406 also includes a code compiler 412 (e.g., a C# code compiler, etc.). The purpose of this module 412 is to convert the code assembled by the content builder module 406 from a source format to an executable format. (The proxy functionality 208 can also produce code that is specifically tailored for particular types of receiving devices 202.)

Because compilation is a normal process performed by the proxy functionality 208 (according to the present invention), a developer can leverage this capability by embedding supplemental source code into the original markup content 108 itself. The code can be expressed inline within the content 108, or can be referenced by the content 108 using a pointer. To repeat, the use of code-compiling functionality that is separate from the receiving device 202 is advantageous because it eliminates the requirement that the receiving device 202 implement conventional scripting functionality to present DHTML content.

In terms of physical implementation, the proxy functionality 208 can be built using any combination of processing equipment. For instance, the proxy functionality 208 can be implemented by one or more server computers (such as, potentially, a "farm" of such server computers performing the same function or different allocated functions). A server computer can include many of the basic components shown in FIG. 3, namely, one or more processors, memory (RAM, ROM, etc.), storage devices and associated media interfaces, user interface functionality, and so forth.

The operation of the proxy functionality 208 will be further clarified in the Subsection A.4 (below), which provides examples of the conversion operation performed by this module 208.

A.3. The Client-Side Content Processing Functionality

Figure 5:
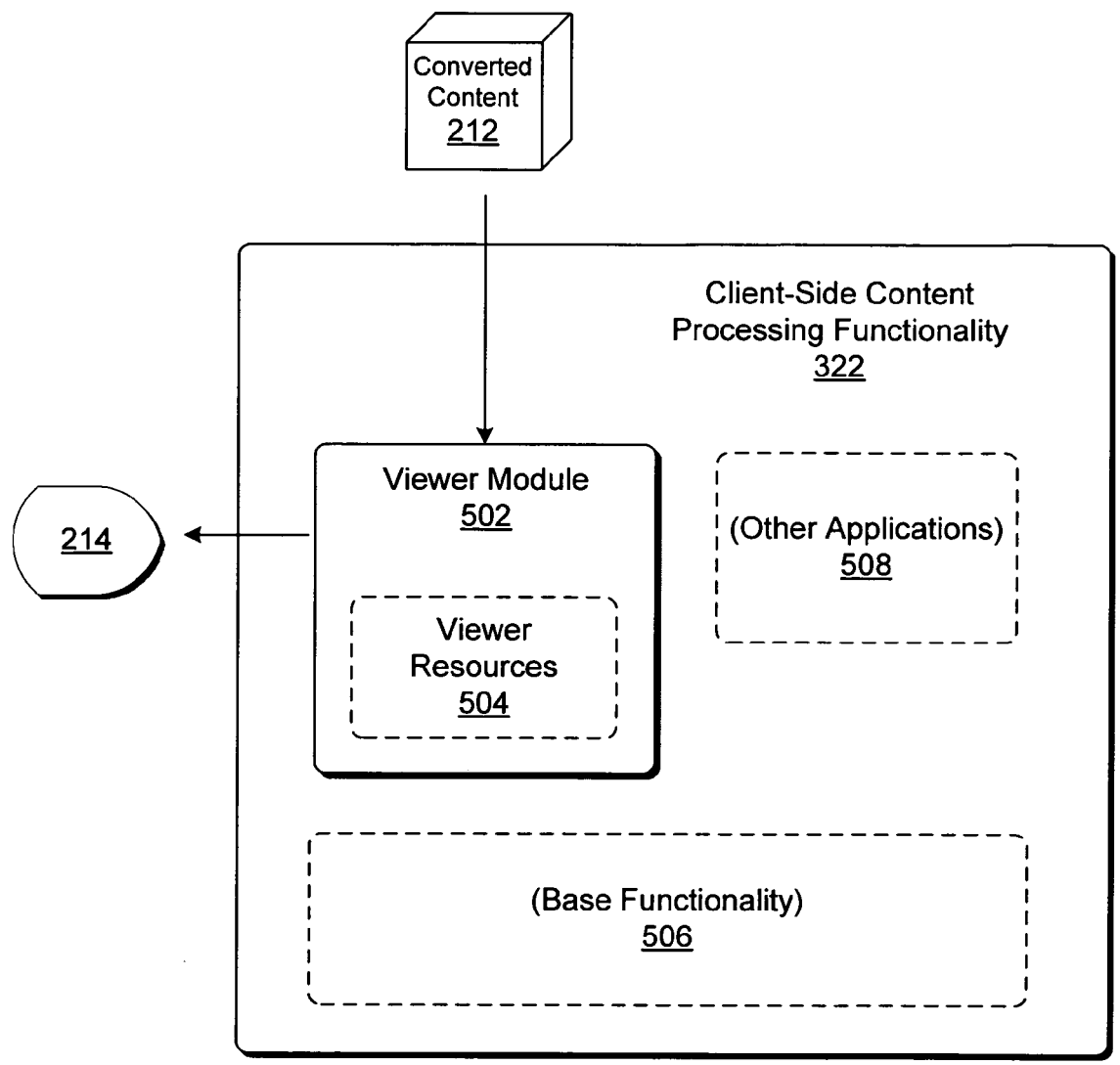
FIG. 5 shows exemplary client-side content processing functionality use in the receiving device of FIGS. 2 and 3.

FIG. 5 shows exemplary components of the client-side content processing functionality 322 introduced in the context of FIG. 3. It includes various components which will be explained below.

First, the client-side content processing functionality 322 includes a viewer module 502. The purpose of this module 502 is to process the converted content 212 into consumable content for presentation on the output device 214. It does this by executing the code in the converted content 212. Namely, the viewer module 502 executes a drawing method contained in the converted content 212. The drawing method presents the consumable content when it is invoked, and also optionally changes the behavior of the displayed content when key events are received in response to user input.

In a virtual machine environment (if optionally employed), the viewer module 502 can execute the code by using common language runtime resources (not shown). Further, the viewer module 504 can also rely on viewer resources 504, which represent utilities that are specifically adapted for use by the viewing module 502. That is, the viewing resources 504 may comprise a code library providing functions that can be utilized to present to the received content. According to one function, the viewing module 502 and associated viewing resources 504 can present an on-screen keyboard to facilitate the receipt of input by the user (as will be described in greater detail in connection with FIG. 13).

In any event, to repeat, the viewer module 502 and associated viewer resources 504 preferably represent an economical allocation of code; this is because one exemplary goal is to reduce the complexity and demands of such functionality for use by resource-constrained client devices. In a preferred implementation, the viewer module 502 and the viewer resources 504 do not rely on traditional browser functionality (e.g., a CSS engine, a scripting engine, a layout engine, and so forth).

The client-side content processing functionality 322 can also provide other functionality that does not specifically serve a role in the invention described herein. Such functionality includes base functionality 506. The base functionality 506 represents logic used to perform the core low-level processing functions of the receiving device. The client-side content processing functionality 322 also includes other applications 508 which perform higher-level end-use-specific functions that rely on the base functionality 506.

The proxy mechanism 208 and the receiving device 202 can be modified in various ways to make data processing more efficient. For example, caching can be employed at various locations in the system 200. For example, the proxy mechanism 208 can cache results it has generated in processing markup content in connection with requests. In the event that the same markup content is requested again (or parts thereof), the proxy functionality 208 can retrieve the precalculated results from its cache (not shown). In a similar manner, the receiving device 202 can cache code that it has received from the proxy functionality 208 from prior requests. In the event that the receiving device 202 needs this content again, it can call on its cache first, without making another request to the proxy functionality 208. Cache management mechanisms can be used for determining what cache content to retain and which cache content to discard, as well as defining the criteria which determines whether a cache entry satisfies a current request.

Indeed, either (or both) of the proxy functionality 208 and the receiving device 202 can also proactively generate code-bearing content that is likely to be requested on a frequent basis. For example, the receiving device 202 can store assemblies that implement certain core UI functionality that it frequently relies on. For example, such assemblies can be burned into the flash memory of the receiving device 202.

A.4. Illustrative Examples of Processing Performed by the System

Figure 6:
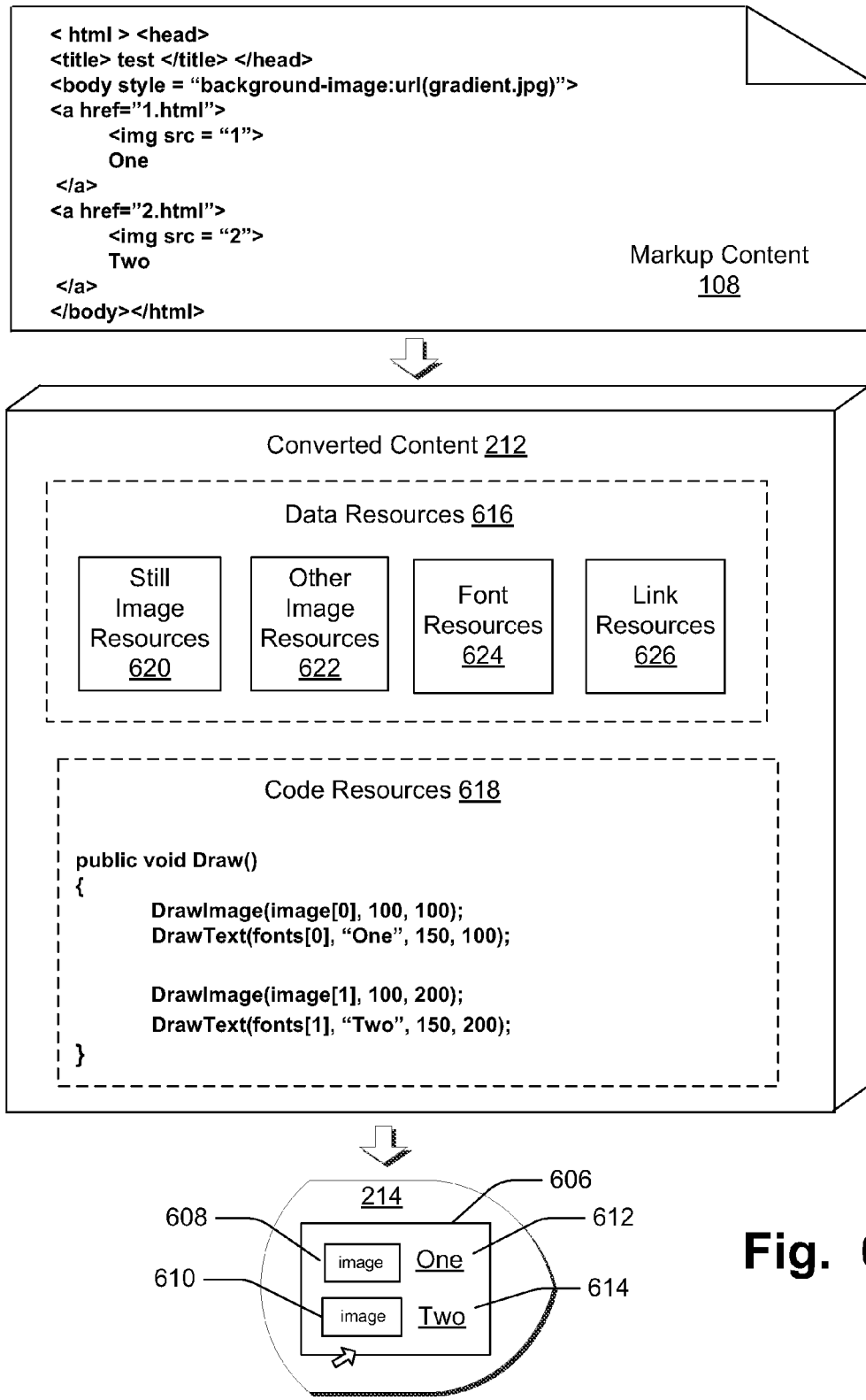
FIG. 6 illustrates an exemplary transformation of markup content to code-bearing content using the system of FIG. 2.
Figure 7:
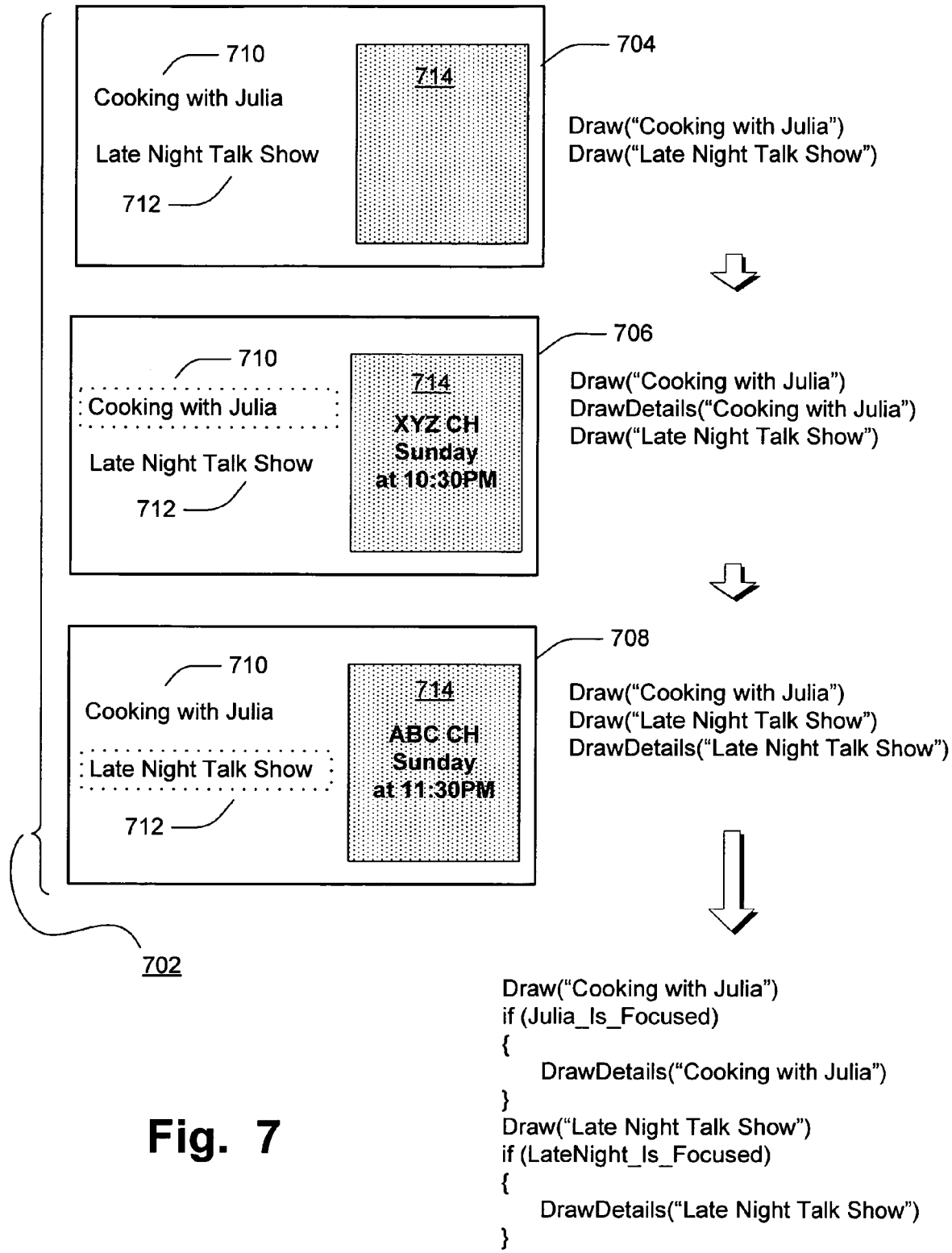
FIG. 7 illustrates a more specific transformation of markup content using the system of FIG. 2, particularly illustrating the use of difference-forming functionality to identify focus-dependent features of the consumable content.

FIGS. 6 and 7 provide examples of the operation of the system 200 described above.

Beginning with FIG. 6, this figure shows the transformation of particular markup code 108 into converted content 212, which is then presented as consumable content 606 on the display device. The consumable content 606 includes a very simple web page layout, including two image features (608, 610) and two associated text features (612, 614).

The markup content 108 expresses the consumable content 606 in markup form, using HTML or DHTML (or some other markup format). As per convention, the markup content 108 demarcates different elements in the content with appropriate beginning and ending tags. The markup content 108 further arranges the elements in nested hierarchical fashion.

The proxy functionality 208 converts this markup content 108 into the converted content 212. The converted content 212 includes two portions: a data resources portion 616 and a code resources portion 618. The data resources portion 616 includes resources that are needed to present the consumable content 606. Exemplary data resources include: still image resources 620 (such as still MPEG background information); other image resources 622 in the consumable content 606 (such as the illustrated image One and image Two); font resources 624; and link-related resources 626 (e.g., URL's referenced in the consumable content 606, navigation information which identifies the navigation behavior of the consumable content 606, and so forth).

In one case, image content may comprise graphics animation that forms a sequence of presentations (that produce the appearance of motion when played back). One approach to coding this motion content is to break the content up into its individual components and then generate code which defines the manner in which these components are presented in a series to create the effect of a motion presentation. This approach is advantageous because it enables the receiving device 202 to use a single processing technique to present both static pictures and animated sequences. This is because, in effect, the animated sequence is being produced by stringing together a series of static pictures, in a manner defined by controlling code. The same approach can be applied to any motion sequence (such as a video vignette).

The code resources 618 include a code module containing drawing instructions which, when executed by the receiving device 202, will present the consumable content 606. Namely, this code module implements a drawing method that can be invoked by the receiving device 202 to execute the instructions contained therein. The instructions in the drawing method, Draw( ) contain function-type calls. The function-type calls include parameters that have been gleaned from the markup content 108, such as a parameter which identifies text to be displayed, a parameter which provides a reference to an image to be displayed (in the images resources 622), and so forth. The parameters can also identify position information that identifies the location at which features are to be displayed. In contrast, in the original declarative form, the markup code simply describes displayable features, without embodying the functionality to carry out actual drawing operations (this task being traditionally left to the browser/ scripting functionality.)

FIG. 6 corresponds to a case in which the code resources 618 do not include conditional content (e.g., if-type branching instructions). This is because the consumable content 606 does not change appearance (or change in any other respect) when the user interacts with the consumable content 606.

FIG. 7, by contrast, develops another simplified example that illustrates the processing of consumable content that has a conditional component. Consider three states of a particular piece of consumable content 702: state 704; state 706; and state 708). The consumable content 702 provides two program listings, a program named "Cooking with Julia" 710 and a program named "Late Night Talk Show" 712. The consumable content 702 also presents a panel 714 which provides information regarding when the two programs (710, 712) are scheduled to air. More specifically, when the user focuses on the first program listing 710, the consumable content 702 will display the scheduled airing of the first program in the panel 714, and when the user focuses on the second program listing 712, the consumable content 702 will present the scheduled airing of the second program in the panel 714. State 704 corresponds to the case in which neither listing (710, 712) receives focus; state 706 corresponds to the case in which the first listing 710 receives focus; and state 708 corresponds to the case in which the second listing 712 receives focus.

The right-hand side of FIG. 7 shows how the proxy functionality 208 can develop a complete feature set by enumerating the features of the consumable content 702 in its different possible states. Namely, the process starts by forming a base feature set corresponding to the state 704 in which neither listing (710, 712) has focus. This base feature set can be expressed in different ways. Here, it is expressed as a list of drawing operations that include commands to draw the features within the consumable content 702, namely, a Draw ("Cooking with Julia") instruction and a Draw ("Late Night Talk Show") instruction.

After formation of the base set of features, the proxy functionality 208 begins by determining an on-focus set of features. The on-focus set of features comprises a set that aggregates the features that appear (or disappear) when the focusable elements successively receive focus. More specifically, for state 706, the panel 714 displays information "XYZ CH Sunday at 10:30 PM," indicating that the program "Cooking with Julia" will air on channel XYZ on Sunday at 10:30 PM. An enumeration of the contents of this page will therefore yield the same features as the base set (for state 704), plus an additional drawing operation that reflects the information presented in panel 714, namely, DrawDetails ("Cooking with Julia"). The proxy functionality 208 performs the same operations for state 708, resulting in the formation of an enumerated feature set that includes the new operation Draw-Details ("Late Night Talk Show").

Following the formation of the on-focus feature set, the proxy functionality 208 can perform a differencing operation which determines how the on-focus feature set differs from the base drawing set. This can be performed by generating a complete set of on-focus features, and then determining the difference between the on-focus features and the complete set of base feature. (Alternatively, this can be performed for each focusable element in turn, that is, for each focusable element, generating on-focus features that apply to this focusable element, and then determining the difference between these on-focus features and a base set of features associated with that same focusable element.) In this example, the proxy functionality 208 will determine that two unique operations have been added through enumeration of the focusable states, namely: (1) DrawDetails ("Cooking with Julia"); and (2) DrawDetails ("Late Night Talk Show"). The proxy functionality 208 then adds these two new features to the original base set to form the complete set of features. Although it is not the case here, it is possible that placing focus on a focusable element will result in the disappearance of a feature in the base set. In this case, the proxy functionality 208 will add supplemental information to the complete feature set that identifies that there is a contingency associated with one or more entries in the complete feature set.

Finally, FIG. 7 shows a code module that is formed by the content builder module 406 (of the proxy functionality 208). The content builder module 406 adds non-conditional instructions (the "Draw" instructions) for the non-conditional features described above. That is, the text for the program listings (710, 712) appears regardless of the focus state, so the instructions which draw these listings (710, 712) are non-conditional. However, the information in the panel 714 will change depending on which program listing (710, 712) receives focus. Accordingly, the content builder module 406 devotes contingent if-type branching instructions to draw this content. Upon execution of the draw method, these drawing instructions will only be performed if the conditions expressed in the if-statement are met (namely, only if the appropriate focusable elements receive focus by the user in response to key inputs by the user).

A.5. Use of Code in Markup Content

Figure 8:
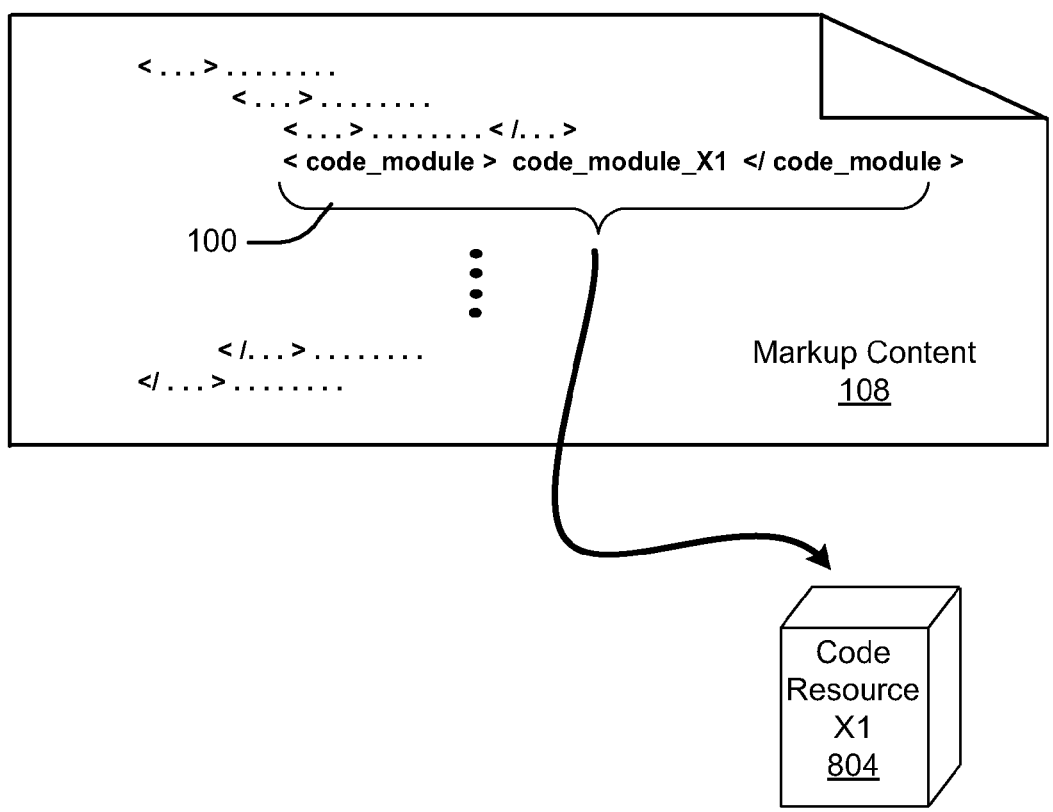
FIG. 8 illustrates a manner of leveraging the proxy functionality of FIGS. 2 and 4 to embed code in markup content (or to embed a reference to code in the markup content).

FIG. 8 pictorially illustrates one of the aspects of the invention introduced above, namely, the ability to add code to markup content 108 itself. This capability is enabled due to fact the proxy functionality 208 is already tasked with the responsibility of forming and compiling code; it adds little overhead to include supplemental code in the markup content 108 itself, which the compiler 412 can compile along with the code created by the proxy functionality 208. The use of code in the markup language further reduces the need for scripting functionality implemented at the receiving device 202.

FIG. 8 shows how an exemplary piece of markup content 108 can reference a code resource 804. In one case, the markup content 802 can include tags (e.g., "the code_module" tags) which bracket (and identify) code presented inline within the markup content 108 itself. Or the tags can include a reference (as is the illustrative case of FIG. 8) that points to the code resource 804 (which may be provided in a library of resources or elsewhere). Upon processing by the proxy functionality 208, the content builder module 406 can incorporate the code resource 804 into the code that it creates.

B. Exemplary Procedural Aspects of the Strategy

FIGS. 9-12 describe the operation of the system 200 in flowchart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the example set forth in this disclosure. As the functions described in these flowcharts have already been explained in prior sections, this section will serve primarily as a brief review of those functions.

B.1. Overview of the Operation of the System

Figure 9:
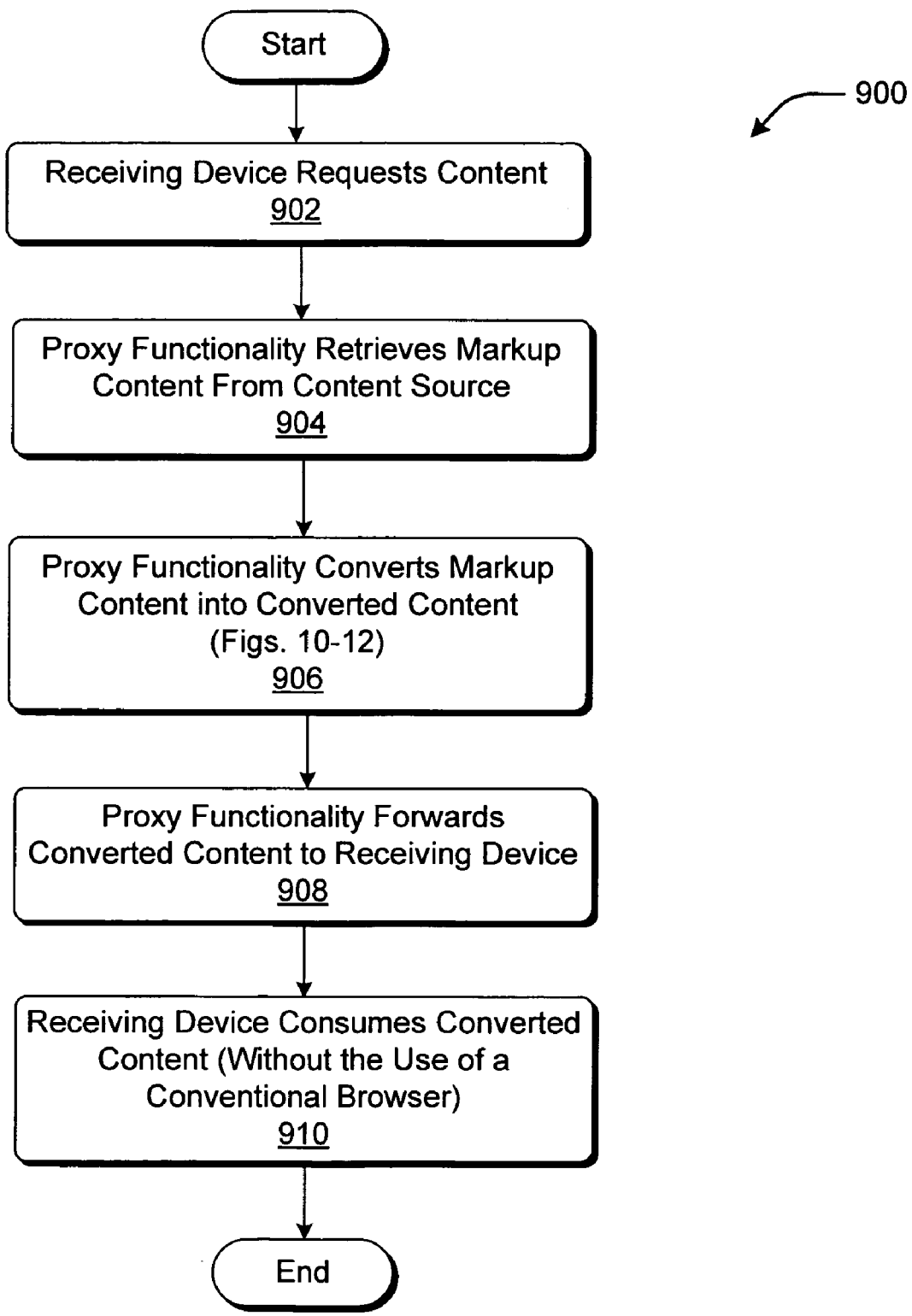
FIG. 9 shows an exemplary procedure which sets forth an overview of the manner of operation of the system of FIG. 2.

FIG. 9 shows a procedure which presents an overview of the operation of the system 200 shown in FIG. 2. In step 902, the receiving device 202 requests consumable content (e.g., a web page). The request can be formatted as an HTTP request. In step 904, the proxy functionality 208 receives this request and retrieves the markup content 108 from the markup source 206. In one case, the HTTP request can include parameters that specifically target the proxy functionality 208; in another case, proxy functionality 208 intercepts the request, e.g., by providing functionality that redirects a request sent to a particular source to the proxy functionality 208.

Figure 10:
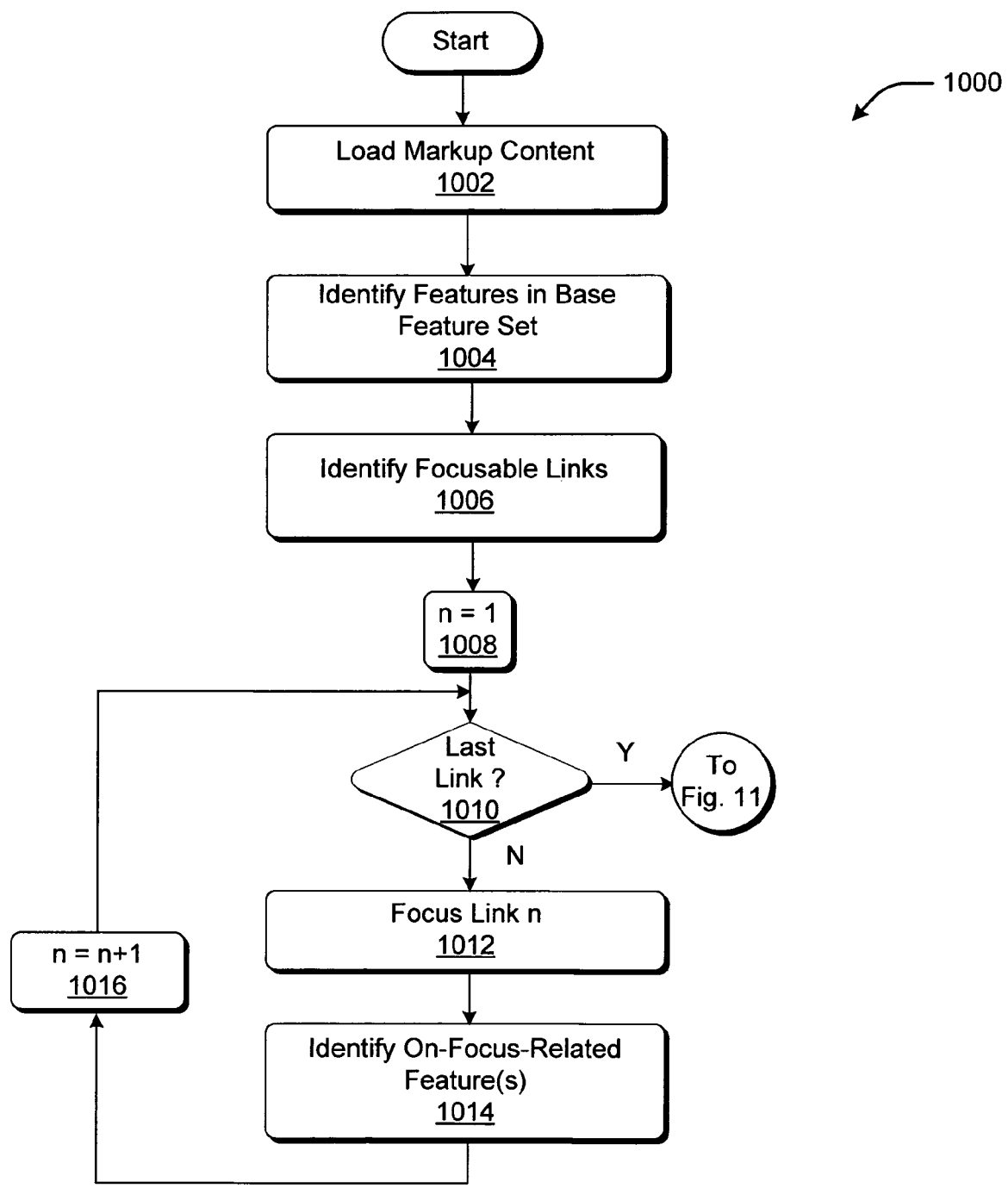
FIGS. 10-12 show a more detailed exemplary procedure which sets forth the operation of the proxy functionality of FIGS. 2 and 4.
Figure 11:
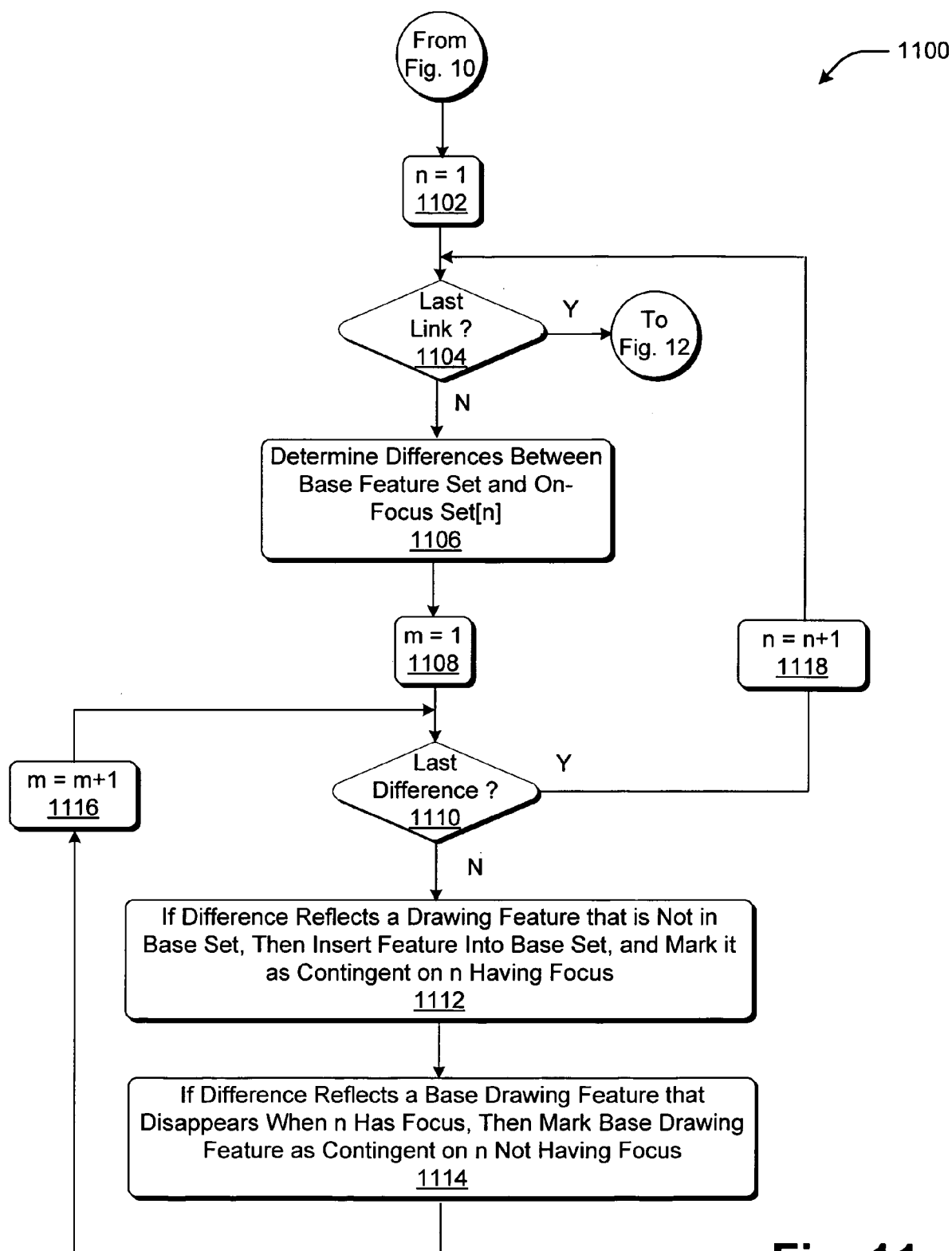
Figure 12:
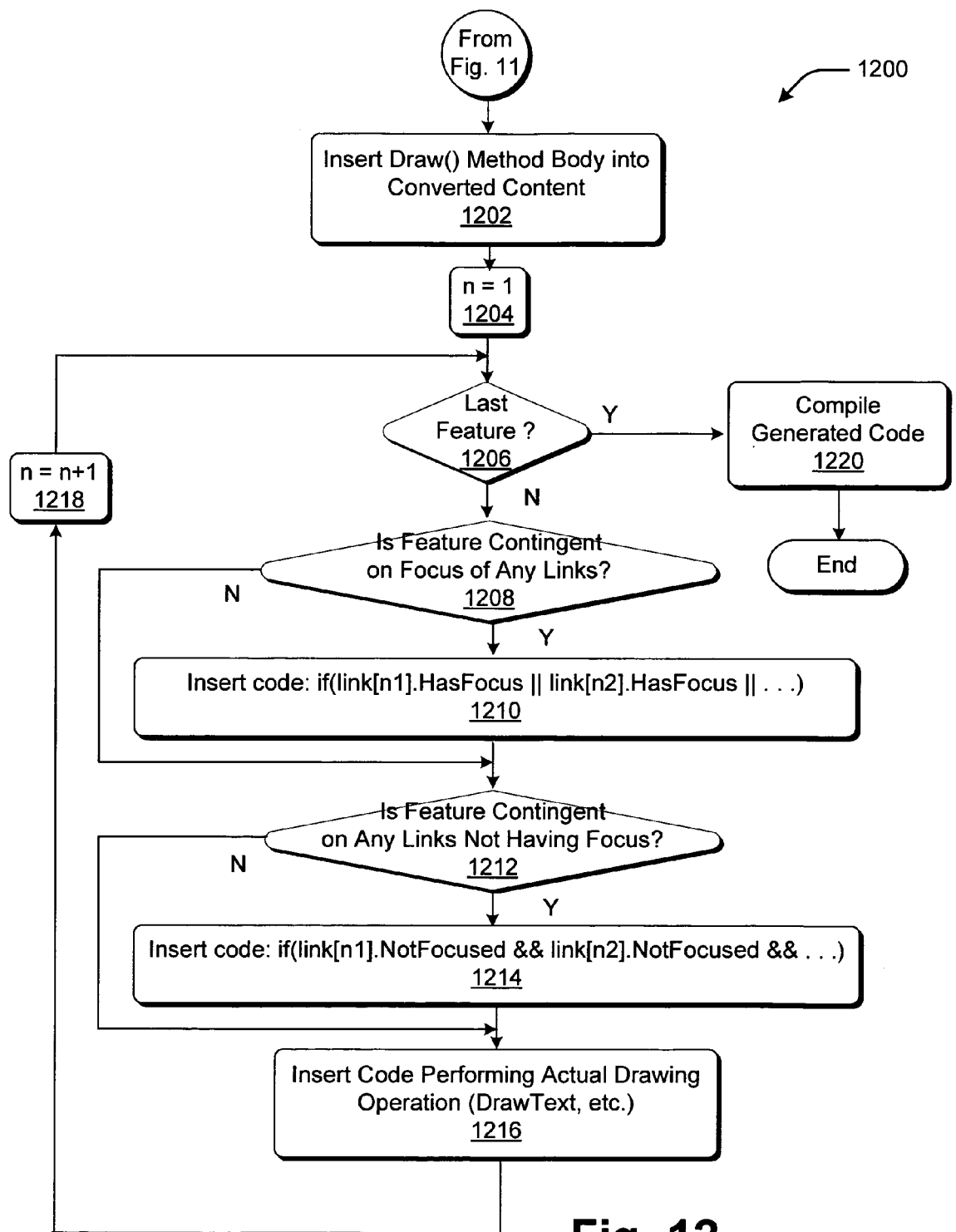

In step 906, the proxy functionality 208 converts the markup content 108 into the converted code-bearing content 212. FIGS. 10-12, to be discussed below, describe this operation in greater detail.

In step 908, the proxy functionality 208 forwards the converted content 212 to the receiving device 202. In step 910, the receiving device 202 consumes the converted content 212 by executing the code contained in the converted content 212. This consumption can take place without the use of traditional browser functionality.

B.2. Enumeration of Features

FIGS. 10-12 describe how the proxy functionality 208 forms the converted content 212. First, FIG. 10 shows a procedure 1000 that describes the manner in which the proxy functionality 208 identifies all of the features contained within the consumable content (e.g., within a particular web page), including both non-contingent content and contingent content.

In step 1002, the proxy functionality 1002 loads the markup content 108 from the source 206. In step 1004, the proxy functionality 1002 identifies the features in the base set. To repeat, the base set identifies the features of the consumable content for the scenario in which no focusable element receives focus. In step 1006, the proxy functionality 208 identifies all of the focusable elements in the consumable content. The focusable elements may correspond to focusable links in the content.

In step 1008, a counter n is set to a first focusable link entry, namely, n=1. In steps 1010, 1012, 1014 and 1016, the proxy functionality 208 successively steps through the different focusable states associated with the focusable links identified in step 1006, and (in step 1014) identifies the features associated with these focusable states. In the example set forth in FIG. 7, these steps correspond to first identifying the features in the consumable content 702 when the first link 710 receives focus, and then identifying the features in the consumable content 702 when the second link 712 receives focus.

The result of procedure 1000 is the formation of: (1) a base feature set; and (2) an on-focus feature set which identifies a redundant collection of features, formed by aggregating the features associated with individual focusable states.

B.3. Formation of the Complete Feature Set

Upon the completion of procedure 1000 shown in FIG. 10, the processing advances to the procedure 1100 shown in FIG. 11. This procedure 1100 identifies the operations used to compile the base feature set and the on-focus feature set into a non-redundant complete feature set.

Steps 1102, 1104 and 1106 sequence through different focusable links (by incrementing the counter n upon processing each focusable link). The heart of this procedure is step 1106, which determines the differences, for a particular focusable state (in which a focusable element n receive focus), between the base feature set and the on-focus feature set (associated with this focusable state n).

Steps 1110, 1112, 1114, 1116 and 1118 process the differences identified in step 1106. Namely, for each focusable link, these steps sequence through the detected differences between the base feature set and the on-focus feature set (pertaining to focusable link n). In step 1112, if the difference m under consideration reflects a drawing feature that is not in the base set, then the proxy functionality adds this feature to the base feature set, and marks this feature as contingent on focusable link n having focus. In step 1114, if the difference m under consideration reflects a feature in the base feature set that disappears when focusable link n has focus, then the proxy functionality marks this base feature as contingent on n not having focus.

The result of the operation described in FIG. 11 is the formation of a final feature set, containing a complete and non-redundant inventory of features encompassed by a particular piece of consumable content (e.g., a particular web page).

The enumeration of features shown in procedures 1000 and 1100 conforms to the case where only one focusable link can receive focus at any one time. It is possible to provide consumable content where more than one link can receive focus, and the behavior of the consumable content may be uniquely based on a particular combination of focusable links that have received focus (e.g., a state in which links A and B receive focus may provide different behavior compared to a state in which links A and C receive focus). In this case, the procedures identified above can be appropriately modified to account for these more complex conditional permutations of possible focusable states.

B.4. Formation of the Code

Finally, FIG. 12 shows a procedure 1200 used to transform the final feature set into code. In step 1202, the procedure 1200 initializes the process by inserting a draw method into the converted content 212. This draw method is the container which provides the instructions to draw the content expressed in the markup content 108.

Steps 1206-1218 advance through the features in the final feature set, converting the features to appropriate drawing instructions. More specifically, in step 1210, the proxy functionality 208 provides conditional branching instructions in the code when the feature under consideration is dependent on any of the focusable links receiving focus. In step 1214, the proxy functionality 208 provides conditional branching instructions in the code for the case when the feature under consideration is dependent on any of the focusable links not receiving focus. Step 1216 performs the actual step of adding the drawing instruction which draws the feature itself (which will be a conditional instruction if steps 1210 or 1214 were invoked).

When the above procedure has finished sequencing through the features in the final feature set, the source code has been formed. In step 1220, the proxy functionality 208 compiles the thus-formed source code into executable code.

C. Exemplary Search-Related Application

The above-described strategy has numerous applications. This section describes an exemplary search-related application of the strategy.

Figure 13:
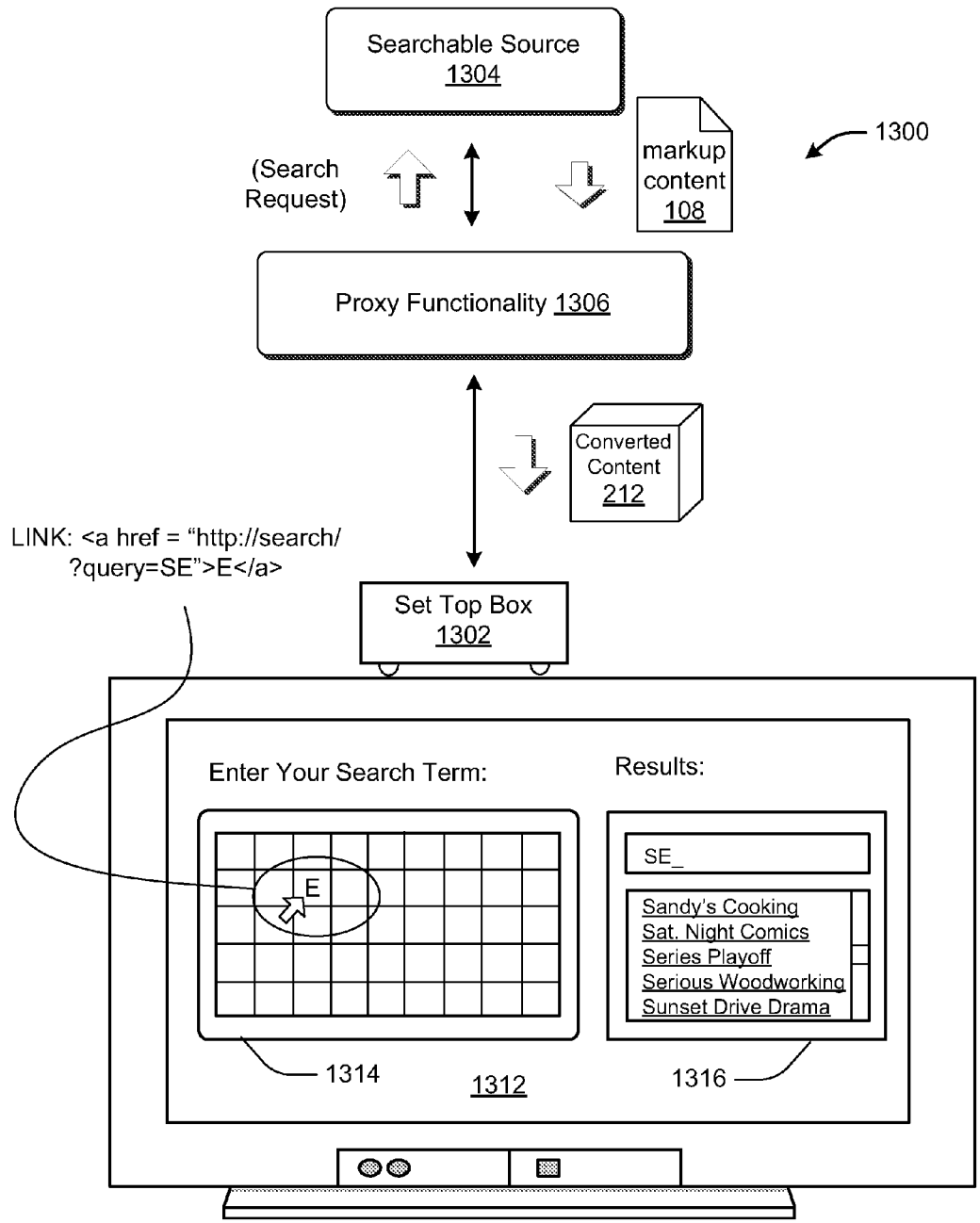
FIG. 13 shows an exemplary search-related application of the system of FIG. 2.

Consider the exemplary system 1300 of FIG. 13. The system 1300 has the same basic components as the system 200 of FIG. 2. Namely, the system 1300 includes a receiving device 1302 that can receive consumable content from a source 1304 via proxy functionality 1306. As previously described, the proxy functionality 1306 transforms markup content 1308 (or other type of content) received from the source 1304 into code-bearing converted content 212. The receiving device 1302 can present the converted content 212 as a user interface page on an output device 1312.

More specifically, in a search-related context, the receiving device 1302 can generate and transmit a search request to the searchable source 1304 via the proxy functionality 1306. The search request specifies at least one search term. The searchable source 1304 performs a search based on the search term, and formulates its response in the format of markup content 1308 (e.g., HTML content). The proxy functionality 1306 receives the markup content 1308, transforms it into the code-bearing converted content 1310, and sends the converted content 212 to the receiving device 1302 where it is displayed on the output device 1312.

To perform the above functions, the system 1300 can provide a user interface (UI) input mechanism 1314 for allowing the user to enter search terms. The system 1300 can provide a separate result pane 1316 for providing the results of the search operation. According to one exemplary implementation, the input mechanism 1314 can comprise a user interface presentation that simulates a collection of keys; for example, the input mechanism 1314 can simulate a keyboard for entering alphanumeric search terms.

In one implementation, the system 1300 can process each keystroke entered via the input mechanism 1314 as a separate search request, prompting the searchable source 1304 to provide search results for each keystroke. For example, each key of the input mechanism 1314 can have hyperlink information (e.g., HTML information) associated therewith. For each key, this hyperlink information identifies an HTTP search request. For example, assume that the user enters an initial letter "S" of a search operation by activating an associated "S" key in the input mechanism 1314 (a user can enter information into the input mechanism 1314 via the remote controller 218, or some other input mechanism). This action prompts the system 1300 to invoke an HTTP request that is embedded in the hyperlink information. More specifically, striking the key "S" can invoke the hyperlink information defined by: link <a href="http://search/?query=S">S</a>, which supplies the HTTP request: http://search/?query=S. The system 1300 processes this search request by forwarding it to the searchable source 1304 via the proxy functionality 1306. The searchable source 1304 generates a markup reply 1308 which contains a list of information which matches the search term (e.g., comprising items that begin with the letter "S"). The proxy functionality 1306 then processes this markup reply 1308 by transforming it into converted content 212. The receiving device 1302 presents the converted content 212 as a list of matching items within the result pane 1316.

As part of the search response, the search operation also modifies the hyperlink information associated with the keys of the input mechanism 1314 to reflect prior input actions (if any) made by the user. In the above example, the hypertext information is modified by the fact that the user previously activated the "S" key. For example, the "E" hypertext information can be modified to adopt the following hyperlink form: <a href="http://search/?query=SE">E</a>.

Assume that the user next strikes the "E" key. This prompts the system 1300 to generate an HTTP request: http://search/?query=SE (which comprises an aggregate of the first and second search terms). As before, the system 1300 processes this request by forwarding it to the searchable source 1304 via the proxy functionality 1306. The searchable source 1304 generates a reply 1308 which contains a list of information which matches the search request (comprising entries that begin with the letters "SE"). Accordingly, striking the letter "S" following the letter "E" has the effect of narrowing the search results. The proxy functionality 1306 processes this reply 1308 by transforming it into the converted convent 212, and the receiving device 1302 again presents the converted content 212 as a list of matching items in the result pane 1316 (which replaces the previous list of matching items associated with the letter "S" alone).

This same process can be repeated by entering additional letters in the manner described above, having the effect of successively narrowing the search presented in the result pane 1316. Moreover, the system 1300 successively supplies more constrained hyperlink information to populate the input mechanism 1314; namely, at any point in time, each hypertext link reflects an aggregation of prior search requests. Although not shown, a user can reset the input mechanism 1314 by activating an appropriate user interface control (e.g., a "clear search" button, etc.).

The user may eventually identify an item in the result pane 1316 that matches his or her interests (e.g., where that item may correspond to a specific item being sought). For example, in a media presentation environment, the user can use the system 1300 to search for media programs (e.g., movies, television programs, etc.). The user performs this task by entering letters into the input mechanism 1314 that describe the item being sought (such as the title of the program, etc.). The system 1300 responds by presenting a successively narrowing list of matching programs in the result pane 1316 upon each key stroke. FIG. 13 shows an exemplary list in the result pane 1316 that is displayed after the user enters two letters, "SE." The user can activate an item in this list by activating a hypertext link associated with this item. This can prompt the receiving device 1302 to generate a request for additional information regarding the selected item (which is processed by the proxy functionality 1306 in the same manner described above).

Alternatively, it is possible to allow the user to form a multi-letter search request term and then submit that search request term to the searchable source 1304 (e.g., by entering a "go search" key or the like after the complete multi-letter request has been entered). This implementation will disable the piecemeal search mechanism described above, wherein each keystroke prompts a separate search.

The result pane 1316 is constructed as a scrollable list of items. That is, the user can scroll this list by moving a scroll tab up and down (or right and left). Recall that the proxy functionality 1306 generates code which implements the input mechanism 1314 and the result pane 1316. Thus, the proxy functionality 1306 must include some mechanism for generating code which duplicates the behavior of a scrollable presentation.

The proxy functionality 1306 performs this operation by duplicating different states of the scrollable presentation in which different items in the list appear. The proxy functionality 1306 then defines the position of the scrollable items relative to a reference point in the scrollable presentation (such as the top of the scrollable presentation). These features can also be specifically flagged as scrollable items so that that the subsequent step of code generation can apply the appropriate processing to these items.

During the generation of code, the proxy functionality 1306 defines the positions of items in the scrollable presentation using relative coordinates. For example, a scrollable item can be identified by the position (x+offsetX, y+offsetY); in this formulation, x and y represent reference coordinates within the scrollable presentation, and offsetX and offsetY represent the offset of the scrollable item relative to the reference position.

When the receiving device 1302 presents the scrollable presentation, it maintains information regarding the scrolling position of this presentation (which may reflect input operations made by the user in scrolling this presentation). The receiving device 1302 formulates this position information as offset information (offsetX and offsetY), and feeds this offset information as parameters into the draw method. In response, the draw method dynamically duplicates the behavior of a scrollable presentation (but without the conventional use of markup processing, script processing, and so forth).

The above-described manner of constructing the scrollable presentation also applies to all consumable content generated by the proxy functionality 208 (of FIG. 2) in the context of any application. That is, this aspect is not restricted to the search-related application described in this section.

Figure 14:
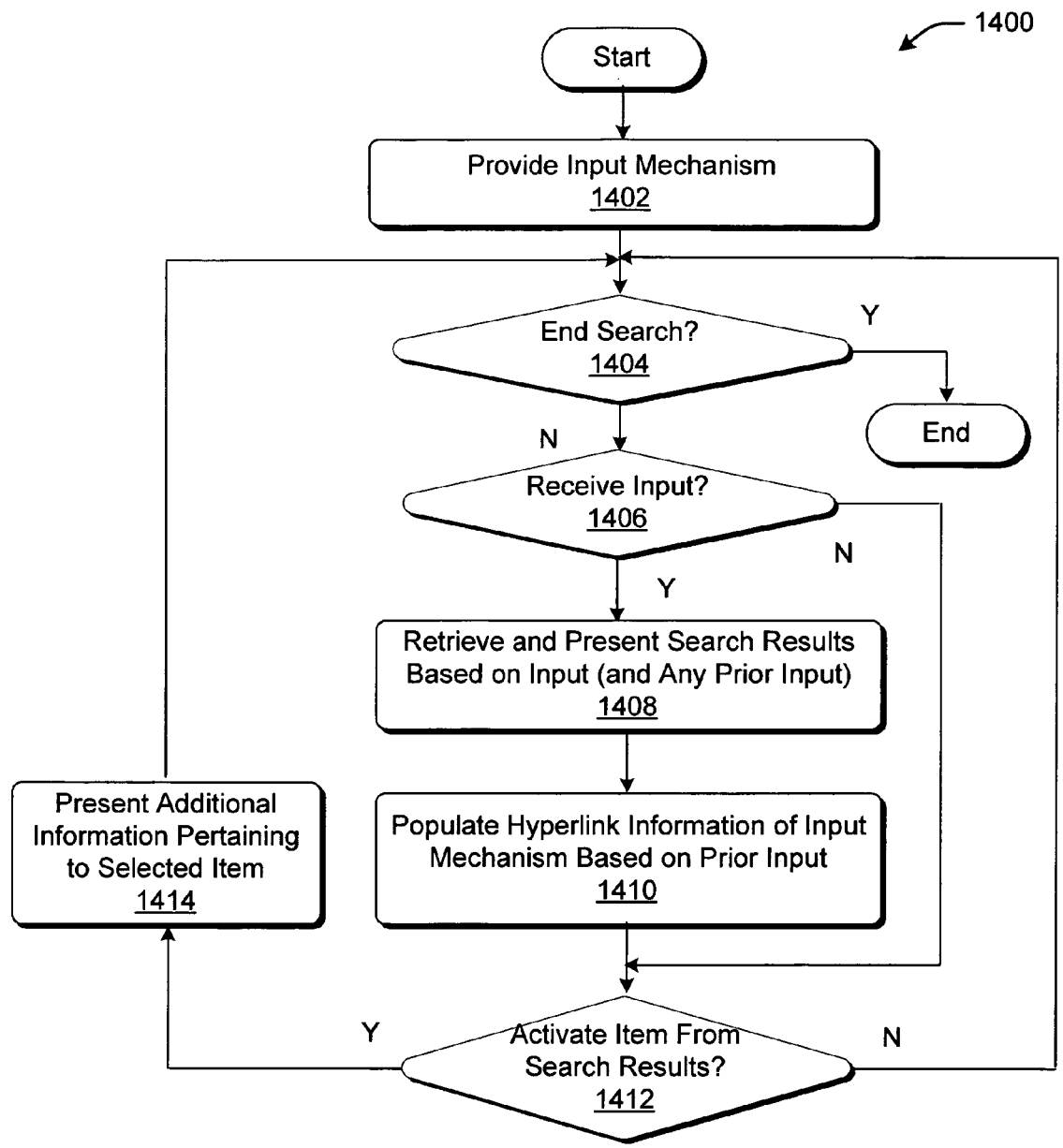
FIG. 14 shows an exemplary manner of operation of the application of FIG. 13.

FIG. 14 shows a procedure 1400 that summarizes the search-related application described above. In step 1402, the user invokes a search operation, which prompts the system 1300 to present the input mechanism 1314. The information used to generate the input mechanism 1314 can originate from a local source (e.g., from a memory of the receiving device 1302), a remote source (e.g., the searchable source 1304), or a combination of local and remote sources. Step 1404 determines whether the user has entered a command to terminate the search.

Step 1406 determines whether the user has entered input by activating a key of the input mechanism 1314. If so, in step 1408, the system 1300 retrieves search results from the searchable source 1304 and presents these results in the result pane 1316. In the manner described at length above, the proxy functionality 1306 plays an intermediary role in passing the search request to the searchable source 1304, and then transforming the markup content 1308 received from the searchable source 1304 into the converted content 212.

In step 1410, as part of the response to the search request, the system 1300 also updates the hyperlink information associated with the input mechanism 1314. Namely, this update operation preserves the state of prior searches, such that a subsequent keystroke forms a search term which is a combination of that subsequent keystroke and any other previous keystrokes that constitute a single search operation. The loop in FIG. 14 indicates that this procedure 1400 can be repeated a number of times, successively narrowing the search.

In step 1412, the system 1300 determines whether the user has activated one of the items in the result pane 1316. If so, in step 1414, the system 1300 presents additional information pertaining to the selected item.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for providing consumable content to a receiving device, the method comprising:

receiving, by a server computer, a request from a receiving device for markup document content associated with the consumable content;

loading, by the server computer, the requested markup document content from a source of the markup document content;

converting, by the server computer the markup document content into the consumable content by:

forming, by the server computer, a base feature set based on a state in which focusable elements in the consumable content do not receive focus, the base feature set expressed as a list of drawing operations that include commands to draw features within the consumable content, and the base feature set including at least one feature that is displayed when the focusable elements in the consumable content do not receive focus;

forming, by the server computer, an on-focus feature set based on states in which the focusable elements consumable content successively receive focus, wherein the on-focus feature set includes one or more first additional features that are displayed when at least one of the focusable elements receives focus, one or more second additional features that disappear when at least one of the focusable elements receives focus, or a combination thereof;

determining, by the server computer, differences between features of the base feature set and features of the on-focus feature set for each focusable element; and in response to determining differences between the features of the base feature set and the features of the on-focus feature set for each focusable element, adding, by the server computer, the one or more first additional features that are displayed when at least one of the focusable elements receives focus to the base feature set to produce an identified feature set that includes a list of non-redundant features associated with the consumable content;

forming, by the server computer, code that can be executed by the receiving device to provide the identified feature set, to thereby provide code-bearing content in a ready-to-execute code form in conjunction with data resources referenced by the code, wherein the forming code comprises:

forming, by the server computer, non-conditional code content for at least one feature in the identified feature set having behavior that is not dependent on whether or not a focusable element receives focus and forming, by the server computer, conditional code content for at least one other feature in the identified feature set having behavior that is dependent on whether or not a focusable element receives focus and wherein the conditional code content accounts for at least some of the difference information; and forwarding, by the server computer, the code-bearing content to the receiving device in response to the request.

2. The method of claim 1, wherein the receiving device executes the code-bearing content to provide the consumable content without the use of mark-up language processing functionality or scripting functionality.

3. The method of claim 1, further comprising identifying at least one feature of the markup document content.

4. The method of claim 3, wherein the identifying of said at least one feature comprises identifying at least one or more of the following features in the markup document content: a text-related feature; an image-related feature; a link-related feature; and a form-related feature.

5. The method of claim 1, wherein the code-bearing content comprises code content, and the following data resources:
   image content;
   font content;
   link content; and
   navigational information which identifies navigation behavior of the consumable content when navigation instruction is received from a user.

6. The method of claim 1, wherein the request for document content comprises a search request generated by the receiving device, and wherein the code-bearing content expresses a search result.

7. The method of claim 6, wherein the search request comprises a first search term input via a user interface input mechanism provided by the receiving device, and further comprising, in response to the search request, modifying the user interface input mechanism such that a second search term input via the user interface input mechanism will incorporate the first search term as a component thereof.

8. One or more computer readable storage media containing instructions for implementing the method of claim 1.

9. Proxy functionality for interacting with the receiving device, comprising logic configured to implement the method of claim 1 wherein one or more computer readable storage media comprise instructions for implementing the logic.

10. A method for receiving and consuming consumable content, the method comprising:
    transmitting a request for document content associated with the consumable content;
    receiving a reply from a proxy entity that contains compiled code-bearing content that expresses the document content;
    identifying at least one feature of the document content, to thereby form an identified feature set by:
    forming, by the proxy entity, a base feature set based on a state in which any the focusable elements in the consumable content do not receive focus, the base feature set expressed as a list of drawing operations that include commands to draw features within the consumable content, and wherein the base feature set includes at least one feature that is displayed when a corresponding focusable element in the consumable content does not receive focus;
    forming, by the proxy entity, an on-focus feature set based on states in which the focusable elements in the consumable content successively receive focus, wherein the on-focus feature set includes one or more first additional features that are displayed when at least one of the focusable elements receives focus, one or more second additional features that disappear when at least one of the focusable elements receives focus, or a combination thereof;
    determining differences between features of the base feature set and features of the on-focus features set for each focusable element; and
    adding the one or more first additional features that are displayed when at least one of the focusable elements receives focus to the base feature set;
    forming difference information that indicates at least one difference between the base feature and the on-focus feature set, the difference information includes:
    at least one drawing instruction for presenting at least one on-focus feature when a focusable element receives focus; and
    at least one drawing instruction for removing at least one feature of the document content when a focusable element receives focus;
    storing an assembly of code-bearing content that implements core user interface functionality which is requested on a repeated basis;
    consuming the compiled code-bearing content to provide the consumable content to a receiving device.

11. The method of claim 10, wherein the consuming comprises executing the code-bearing content to provide the consumable content without the use of mark-up language processing functionality or scripting functionality.

12. The method of claim 10, wherein the document content comprises markup content.

13. One or more computer readable storage media containing instructions for implementing the method of claim 10.

14. Receiving device functionality for interacting with the proxy entity, comprising logic configured to implement the method of claim 10 wherein one or more computer readable storage media comprise instructions for implementing the logic.

15. Proxy functionality of a server computer for providing consumable content to a receiving device, comprising:
    proxy management logic residing in a computer-readable storage medium configured to manage the operation of the proxy functionality, including logic configured to receive and process a request for document content;
    content loader logic residing in a computer-readable storage medium, in cooperation with the proxy management logic, configured to:
    form an instance of browser functionality;
    load the requested document content from a source of the document content via the browser functionality; and
    identify at least one feature of the document content to form an identified feature set, wherein the identifying of said at least one feature comprises:
    forming a base feature set expressed as a list of drawing operations that include commands to draw features within the consumable content, the base feature set based on a state in which focusable elements in the consumable content do not receive focus, the base feature set including at least one feature that is displayed when the focusable elements in the consumable content do not receive focus;
    forming an on-focus feature set by:
    successively applying focus to each of the focusable elements;
    identifying one or more first additional features that appear when focus is applied to a first number of focusable elements; and
    identifying one or more second additional features that disappear when focus is applied to a second number of focusable elements;
    wherein
    the on-focus feature set includes the one or more first additional features, the one or more second additional features, or a combination thereof;

determining differences between features of the base feature set and features of the on-focus feature set for each focusable element; and adding the one or more first additional features to the base feature set and content builder logic residing in a computer-readable storage medium, in cooperation with the proxy management logic, configured to form code that can be executed by the receiving device to provide the identified feature set, to thereby provide code-bearing content wherein the proxy management logic is configured to forward the code-bearing content to the receiving device in response to the request.

* * * * *

UNITED STATES PATENT AND TRADEMARK OFFICE
CERTIFICATE OF CORRECTION

| | |
|---|---|
| PATENT NO. | : 7,761,601 B2 |
| APPLICATION NO. | : 11/097814 |
| DATED | : July 20, 2010 |
| INVENTOR(S) | : Steven J. Falkenburg et al. |

It is certified that error appears in the above-identified patent and that said Letters Patent is hereby corrected as shown below:

In column 13, line 21, after "Draw()" insert --,--.

In column 20, line 27, in Claim 1, after "elements" insert -- in the --.

Signed and Sealed this
Third Day of May, 2011

David J. Kappos
*Director of the United States Patent and Trademark Office*